United States Patent
Rutledge

(10) Patent No.: US 10,430,028 B2
(45) Date of Patent: *Oct. 1, 2019

(54) SYSTEM AND METHOD TO CONFIGURE AN AFTERMARKET INTERFACE MODULE USING A GRAPHICAL USER INTERFACE

(71) Applicant: AUTOMOTIVE DATA SOLUTIONS, INC., Montréal (CA)

(72) Inventor: Mark Rutledge, Murrieta, CA (US)

(73) Assignee: Automotive Data Solutions, Inc., Montréal (CA)

(*) Notice: Subject to any disclaimer, the term of this patent is extended or adjusted under 35 U.S.C. 154(b) by 429 days.

This patent is subject to a terminal disclaimer.

(21) Appl. No.: 15/485,066

(22) Filed: Apr. 11, 2017

(65) Prior Publication Data
US 2017/0220211 A1 Aug. 3, 2017

Related U.S. Application Data

(63) Continuation of application No. 13/730,866, filed on Dec. 29, 2012, now Pat. No. 9,619,114.
(Continued)

(51) Int. Cl.
*G06F 3/0482* (2013.01)
*G06F 3/0484* (2013.01)
(Continued)

(52) U.S. Cl.
CPC ......... *G06F 3/0482* (2013.01); *B60W 50/085* (2013.01); *G06F 3/0484* (2013.01);
(Continued)

(58) Field of Classification Search
CPC .......... G05B 2219/25068; G05B 2219/25067; G05B 2219/25066; G05B 2219/25065; G05B 2219/25064; G06F 3/0482; G06F 3/04847; G06F 3/0484; B60W 50/085; B60W 2710/20; B60W 2510/20; B60W 2050/146; B60W 2550/40; G06Q 30/0621
See application file for complete search history.

(56) References Cited

U.S. PATENT DOCUMENTS

2007/0100520 A1* 5/2007 Shah ................. G07C 5/008
701/31.4
2007/0270179 A1* 11/2007 Lee .................. H04M 1/236
455/550.1
(Continued)

*Primary Examiner* — Daniel Samwel
(74) *Attorney, Agent, or Firm* — Trojan Law Offices

(57) ABSTRACT

A system to remotely configure an aftermarket interface module using a graphical user interface ("GUI") is disclosed. The system includes a GUI adapted to display on a computer. The GUI permits a user to select a vehicle model, year and make to determine the functions of the OEM controls. In addition, the GUI permits a user to select an aftermarket electronics brand and model that the OEM controls will operate. The user selects a particular control signal configuration using the GUI for each of the OEM controls. An interface module is flash programmed with the particular control signal configuration. The interface module is connected to the OEM controls and the aftermarket electronics, where the interface module receives the OEM control signals and controls the aftermarket electronics using the particular control signal configuration.

5 Claims, 24 Drawing Sheets

Related U.S. Application Data

(60) Provisional application No. 61/658,113, filed on Jun. 11, 2012.

(51) Int. Cl.
  *G06Q 30/06* (2012.01)
  *B60W 50/08* (2012.01)
  *B60W 50/14* (2012.01)

(52) U.S. Cl.
  CPC ..... *G06F 3/04847* (2013.01); *G06Q 30/0621* (2013.01); *B60W 2050/146* (2013.01); *B60W 2510/20* (2013.01); *B60W 2550/40* (2013.01); *B60W 2710/20* (2013.01)

(56) References Cited

U.S. PATENT DOCUMENTS

2010/0332979 A1* 12/2010 Xu ................... G05B 19/0426
  715/704
2011/0046788 A1* 2/2011 Daly ................... H04B 1/082
  700/275

* cited by examiner

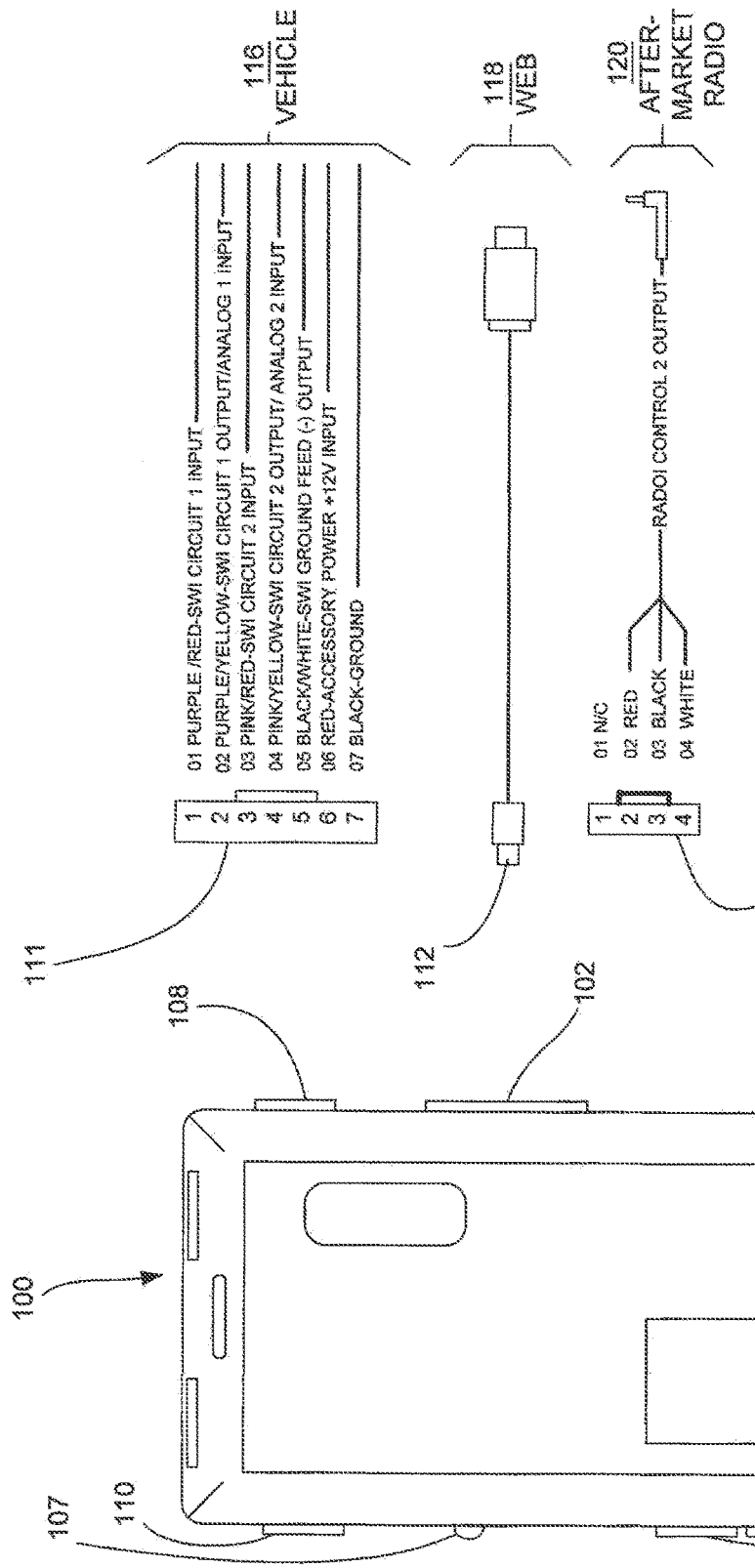

SYSTEM AND METHOD TO CONFIGURE AN AFTERMARKET INTERFACE MODULE USING A GRAPHICAL USER INTERFACE

I. CROSS REFERENCE TO RELATED APPLICATIONS

This application claims the benefit of U.S. patent application Ser. No. 13/730,866, filed Dec. 29, 2012, which claims the benefit of U.S. Provisional Application No. 61/658,113 filed Jun. 26, 2012, all of which are incorporated herein by reference in their entirety.

II. FIELD

The present disclosure is generally related to a system and method to configure an aftermarket interface module using a graphical user interface.

III. DESCRIPTION OF RELATED ART

New vehicles are often provided with onboard entertainment systems, which offer connectivity, voice control and other features that enhance drivers' experiences while improving safety. As always, certain consumers want to upgrade and customize their audio and entertainment systems while maintaining and integrating the original equipment manufacturer ("OEM") system functionality. However, aftermarket entertainment systems typically do not function with OEM vehicle controls (e.g., steering wheel controls) without an interface. Interfaces have been developed that are designed to function with a particular brand of electronics and vehicle. A shortcoming of these interfaces is the inability to have one interface that may be used with several different types of electronics and vehicles.

Other existing interfaces require extensive sequencing by an installer to configure the interface so that the aftermarket entertainment system can be operated by the existing OEM controls. The interface is pre-loaded by the manufacturer with several different possible configurations in memory, then the installer must select the proper configuration using complex sequencing of pressing buttons and responding to indicators of the interface during a programming sequence. A shortcoming of this type of interface is that the interface is limited to function only with those electronics and vehicles that have been pre-loaded in memory. Thus, as new electronics and vehicles are available to the market, the existing interfaces become outdated. Accordingly, there is a need for a method and system to configure aftermarket interface modules that is adapted to be used with several different electronics and vehicles that will not become outdated as new models are available to the public. In addition, there is a need for an interface module that is easy to configure without extensive sequencing procedures. However, in view of the prior art at the time the present invention was made, it was not obvious to those of ordinary skill in the pertinent art how the identified needs could be fulfilled.

In addition, there is a need to increase the functionality of OEM controls. As described above, vehicles often have steering wheel controls (e.g., buttons) that can be adapted for use with a new aftermarket radio or other aftermarket electronics. However, in many cases, there are just a few OEM buttons to assign to many possible aftermarket electronics functions. This results in a less than perfect mapping of the OEM buttons to aftermarket electronics functions. Customers must often choose between two desired functions resulting in a compromise and inability to use all the features that may be available for the aftermarket electronics. Accordingly, there is a need for a method and system to configure aftermarket interface modules that increases the functionality of the OEM controls. However, in view of the prior art at the time the present invention was made, it was not obvious to those of ordinary skill in the pertinent art how the identified needs could be fulfilled.

IV. SUMMARY

In a particular illustrative embodiment, a system to configure an aftermarket interface module using a graphical user interface ("GUI") is disclosed. The GUI is adapted to display on a computer and an interface module is adapted to connect to the computer. The GUI is configured to be remotely accessed by the computer using a communication network, such as the Internet, for example. Alternatively, the computer is configured to store the GUI locally on the computer rather than using the Internet to access the GUI. The system is adapted to generate a particular control signal configuration using vehicle and aftermarket electronics information selected by a user using the GUI. The interface module is adapted to receive and store the particular control signal configuration generated by the GUI. The interface module configured with the particular control signal configuration can control the aftermarket electronics with the OEM controls. The electronic device may be, for example, an aftermarket stereo, an entertainment device, or any combination thereof, installed in a vehicle.

In another particular illustrative embodiment, a method to configure an aftermarket interface module using a graphical user interface is disclosed. The method includes connecting the interface module to a remote computer. Also, the method includes generating a particular control signal configuration for the interface module using the GUI and transferring the particular control signal configuration to the interface module. In addition, the method includes configuring the interface module using the particular control signal configuration to enable OEM controls to control an aftermarket electronic device. The method may also include accessing the GUI using the computer operably connected to a communication network. Alternatively, the user may access the GUI stored locally on the computer or wirelessly, or any combination thereof. The communication network may be the Internet or an intranet.

In another particular illustrative embodiment, a non-transitory processor readable medium having processor instructions that are executable to cause a processor to perform certain functions is disclosed. The instructions may include the processor displaying a graphical user interface ("GUI") on a computer screen. A vehicle may be selected in response to a user choosing the vehicle from a vehicle drop down menu using the GUI and display at least one OEM control image (e.g., steering wheel control) on the GUI based at least in part on the selected vehicle. In addition, an aftermarket electronic device may be selected in response to the user choosing the device from a device drop down menu using the GUI and display at least one OEM control on the at least one OEM image using the GUI. In addition, the instructions may cause the processer to assign a desired function to the at least one OEM control in response to the user choosing the function from a function drop down menu using the GUI and generate a particular control signal configuration. The particular control signal configuration may be transferred to an interface module, where the particular control signal configuration transferred to the interface module enables an OEM control to control the aftermarket electronic device via the interface module.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

FIG. 1 is a schematic view of an illustrative embodiment of an aftermarket interface module of a system that may be remotely configured using a graphical user interface;

FIG. 2 is a schematic view of an illustrative embodiment of ports and wiring that may be used with the aftermarket interface module to remotely configure the interface module and to facilitate communicate between OEM controls and an aftermarket radio;

VI. DETAILED DESCRIPTION

Figure 3:
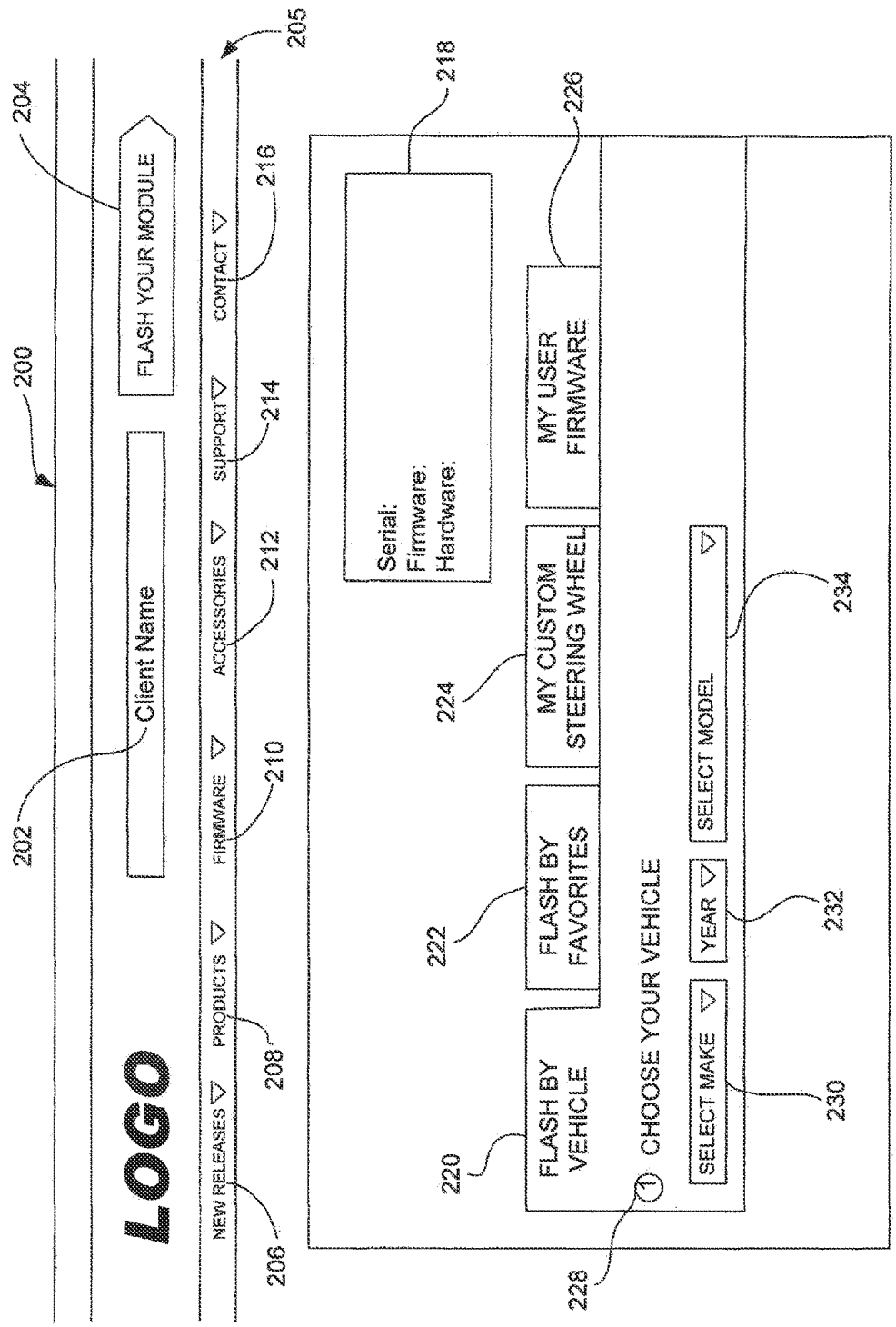
FIG. 3 is an illustrative example of web pages that may be generated by the system, pertaining to remotely configuring the interface module using a graphical user interface.

The system and method is a universal OEM control and aftermarket electronics replacement interface module featuring a web-based GUI. In addition, the system and method is the first and only solution offering control of two or more aftermarket electronics functions from each OEM control. For example, the system and method enables the user to assign two or more aftermarket radio functions to each OEM steering wheel button. An illustrative embodiment uses "time of press" to determine which feature is desired (short press or long press). Alternatively, press count may be used or other means to assign multiple functions. New buttons may be created as combinations of existing ones. The system and method is the first solution to offer users the ability to assign two functions to each OEM control button using an intuitive and revolutionary web-based user interface.

The OEM controls are detected using either an ADC to detect voltage changes or using a communication port to read digital information from the vehicle databus. In either case, the system and method determines how long the button is pressed from the received digital messages or the time the voltage is detected. Using this information, feature 1 or feature 2 is sent and assigned to this button, for example.

The system and method solves the problems with existing solutions. It all but eliminates complex programming and the interface module is configured quickly and effortlessly via a rich, web-based graphical user interface. It also reduces the number of individual SKUs required to interface with all cars. Dealers are able to stock just one interface module and flash at install time with the most current, vehicle-specific firmware.

The system and method paves the way for a new generation of aftermarket head units. When paired with a serially connected aftermarket radio, complete command, control and access to all the OEM systems is made possible. Where a vehicle owner was once dissuaded from upgrading his or her OEM radio due to the cost, complexity and unattractiveness of the existing solutions, the system and method provides the solution. Head unit manufacturers can completely complement the onboard OEM systems without any compromises or tough choices regarding what to give up.

FIG. 1 is a schematic view of an illustrative system to remotely configure aftermarket interface modules using a website graphical user interface system. The system may be used to permit an individual to configure various aspects of operation of an interface module 100 from a remote location. The illustrative system includes an interface module 100 having a first port 102 to communicate between the interface 100 and steering wheel controls of the vehicle 116. A second port 104 of the interface 100 may be used to update the interface module. A third port 106 of the interface 100 is adapted to communicate between the interface 100 and an aftermarket stereo 120. A light emitting diode (LED) 108 may be used as an indicator to a user when configuring the interface 100. A button 110 of the interface 100 may also be used, in part, to facilitate configuring the interface module 100.

Referring now to FIG. 2, a diagram of an illustrative embodiment of vehicle wiring 111 that is used to communicate between the OEM controls of the vehicle 116 and interface 100 is shown. Each wire 111 may be secured to the first port 102 of the interface 100 as required. A USB cable 112 may be used to communicate between the interface 100 and a communications network 118 such as the Internet, for example. Aftermarket electronics wiring 114 is secured to the third port 106 to communicate between the aftermarket electronics 120 and the interface 100.

The communications network 118 may include one or more elements that permit and facilitate communication between the interface 100 and another network. In some cases, a router may be a distinct component, in some instances the router may instead be incorporated into the interface. The router may provide a means of communication between the interface 100 and a broader network by connecting in any appropriate manner to the Internet 118. For example, the router may connect to the Internet via a dial-up connection, a broad-band cable connection, a DSL phone line connection, a fiber-optic connection, wirelessly, or any combination thereof.

A personal computer (PC) may be used to permit a user to view over the Internet the web pages that are provided by the system and method. The PC may be a desktop computer, a laptop computer or a device that is adapted to display web pages, such as a smart phone or a personal digital assistant (PDA).

FIG. 3 us an illustrative example of a home web page of the system. A variety of information may be displayed on the home web page 200. For example the information may include a client name 202, a serial number, firmware and hardware identifiers 218. In addition, the information on the system home page 200 may include tabs that a user may toggle to access additional web pages used to enter information to remotely configure the interface module. The tabs may be used to access web pages to flash by vehicle 220 or flash by favorites 222, for example. The tabs may also be used to access web pages of a user's custom steering wheel 224 and user firmware 226. A server may be adapted to serve up the home web page and other web pages generated by the system. Additionally, the server may be adapted to provide a home web page 200 customized for a particular user or user class. For example, the information that is displayed for a first user may be a set of information previously used to configure the interface module 100. Accordingly, a user can quickly configure several interface modules 100 using the same, or similar, parameters.

The home web page 200 served up by the system may include a number of predetermined configuration options for selection by the user. At least some of the predetermined configuration options may be presented in drop down menus. For example, the predetermined configuration options may include, but are not limited to, choosing a particular vehicle based on the make 230, year 232 and model 234. In some cases, the interface module 100 may download configuration information from the server. The interface module 100 may be flash programmed with a control algorithm that issues commands to the aftermarket radio 120 based at least in part on the selections made by the user.

In FIG. 3, the system has created, provided or otherwise served up a graphical user interface (GUI) and web page 200 that permits a user to log in to begin configuring the interface module 100. For example, a user may log in using a PC, but this is not required. The home web page 200 may, for example, be accessed and displayed on a computer running a thin client application such as Microsoft Internet Explorer. In alternative embodiments, it is contemplated that the interface module 100 itself may have Internet access and web page display functionality.

The system may solicit via a web page a User ID, password, or other identifying information. It should be recognized that if a blank space that a user may enter information into is shown, other ways of data entry such as a drop down menu, a series of check boxes or the like may be used. Similarly, in situations in which a drop down menu is shown, other ways of data entry such as a series of check boxes or blank spaces into which data may be typed or selected may be used.

Once a user has successfully logged into the system, a home web page 200 may displayed that provides an overview. In an illustrative embodiment, the home web page 200 may include common elements that are displayed on many of the web pages that the system may be adapted to provide. For example, the home web page 200 includes a navigation bar 205. The navigation bar 205 provides information to a user that pertains to navigating through the various web pages that are or may be served up by system. The navigation bar 205 may be common to many of the web pages served up by the system and may include several features. A new releases button 206 permits a user to click and view any new updates to the system from a dropdown menu. A products button 208 permits a user to click and view products that are offered. A firmware button 210 permits a user to click and view available firmware. An accessories button 212 permits a user to click and view available accessories. A support button 214 permits a user to obtain assistance for the system. A contact button 216 permits a user to click and view contact information. The navigation bar 205 may include a position confirmation indicator, which provides confirmation of what button has been selected and is currently active.

In FIG. 3, the "Flash By Vehicle" tab 220 has been selected. Within the "Flash By Vehicle" tab 220, it can be seen that a "Choose Your Vehicle" 220 heading is displayed with a row of buttons for dropdown menus. As illustrated, the buttons include a "Select Make" 230, "Year" 232 and "Select Model" 234. Additional buttons (not illustrated) with additional vehicle information may be included in alternative embodiments. Alternatively, fewer buttons may be included, if desired.

Figure 4:
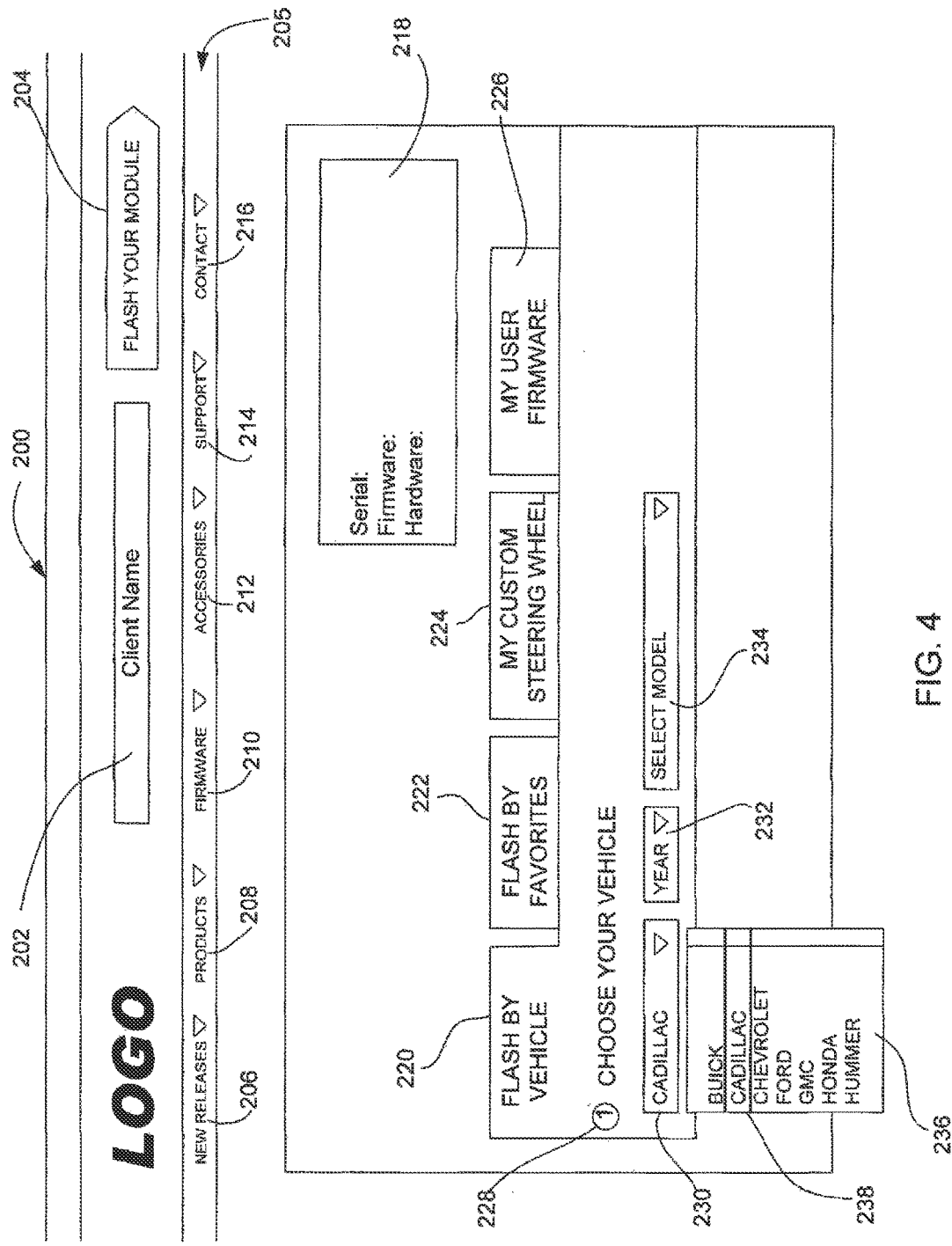
FIG. 4 is an illustrative example of web pages that may be generated by the system, pertaining to configuring the interface module by selecting a particular make of a vehicle.

FIG. 4 provides a vehicle make dropdown menu 236 that may be served up by the system if, for example, a user clicks on the "Select Make" 230 button. It can be seen that the vehicle make dropdown menu 236 displays a list of available vehicle makes to permit a user to select. A position confirmation indicator provides confirmation of what make has been selected and is currently active, which now indicates in FIG. 4 that "Cadillac" has been selected, for example.

Figure 5:
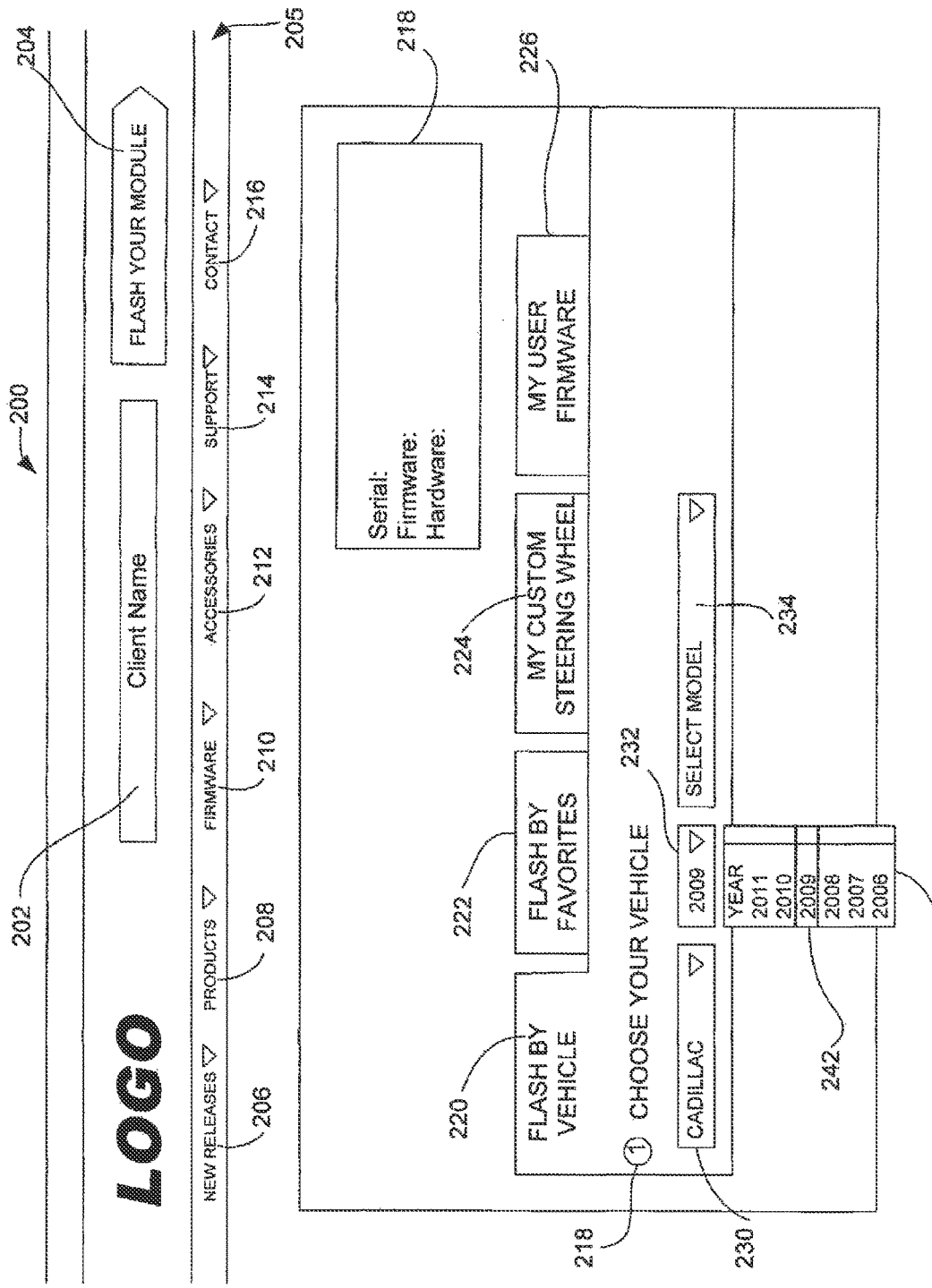
FIG. 5 is an illustrative example of web pages that may be generated by the system, pertaining to configuring the interface module by selecting a particular year of the vehicle.

Moving to FIG. 5, provides a vehicle year dropdown menu 240 that may be served up by the system if, for example, a user clicks on the "Year" 232 button. It can be seen that the vehicle year dropdown menu 240 displays a list of available years of the vehicle to permit a user to select. A position confirmation indicator provides confirmation of what year has been selected and is currently active, which now indicates in FIG. 5 that "2009" has been selected, for example.

Figure 6:
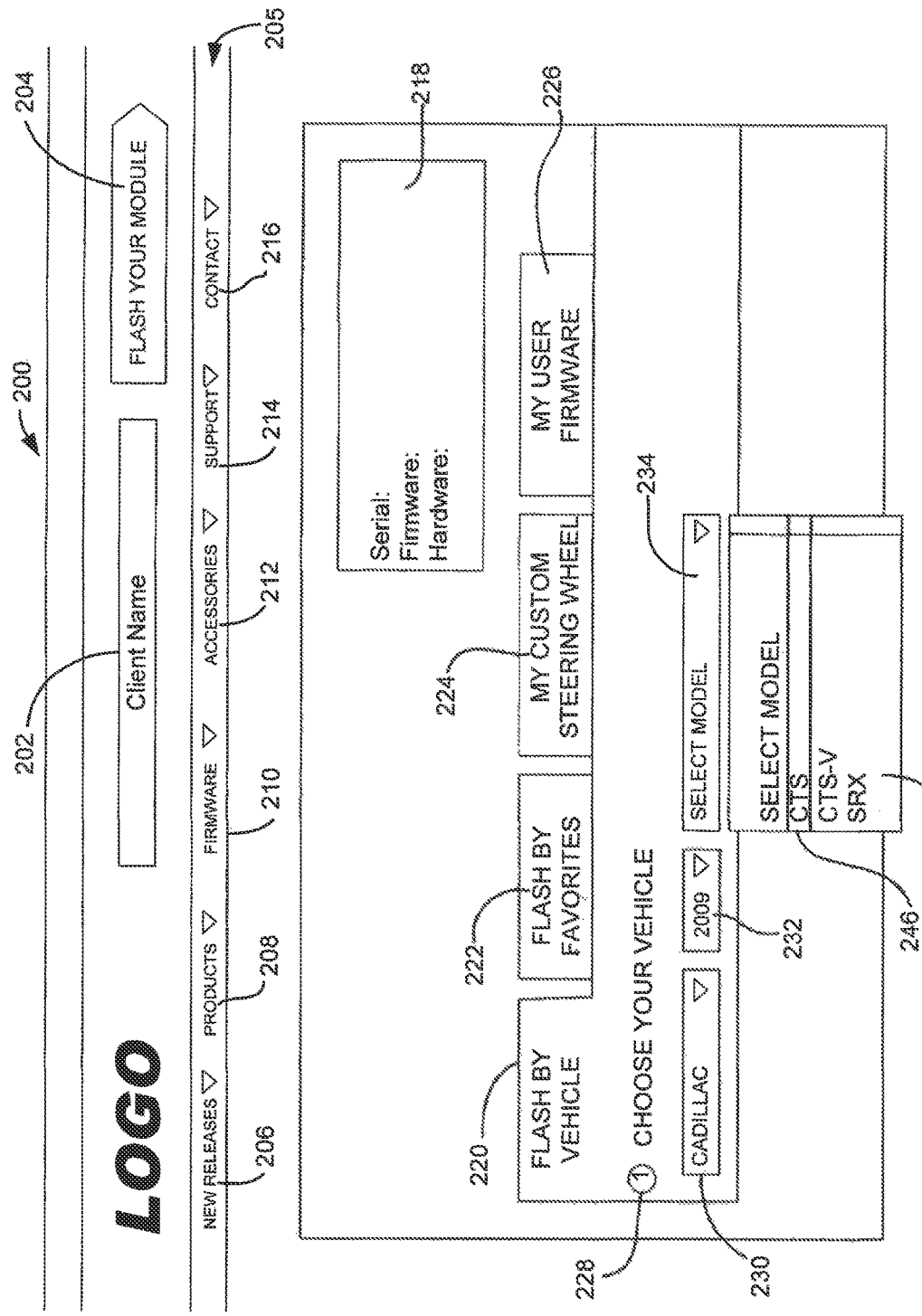
FIG. 6 is an illustrative example of web pages that may be generated by the system, pertaining to configuring the interface module by selecting a particular model of the vehicle.

Referring now to FIG. 6, provides a vehicle model dropdown menu 244 that may be served up by the system if, for example, a user clicks on the "Select Model" 234 button. It can be seen that the vehicle year dropdown menu 244 displays a list of available models of the vehicle to permit a user to select. A position confirmation indicator provides confirmation of what model has been selected and is currently active, which now indicates in FIG. 6 that "CTS" has been selected, for example.

If a particular vehicle or steering wheel is not listed, the system permits a user to select the firmware button 210 described above to generate custom firmware for the interface module to operate with a non-listed vehicle or steering wheel. This is accomplished by taking measurements of the steering wheel controls by using a multi-meter, or other similar means, to determine resistance values, for example. The measurements are entered using the GUI, which can then automatically generate the appropriate custom firmware for the module to perform properly in the vehicle. The user is able to download the custom firmware and configure the steering wheel controls using the GUI. Accordingly, the method and system may be used with old, new, or unusual vehicles without waiting for firmware updates from the manufacturer that must be written by engineers, rather than automatically generated as in the present method and system.

Figure 7:
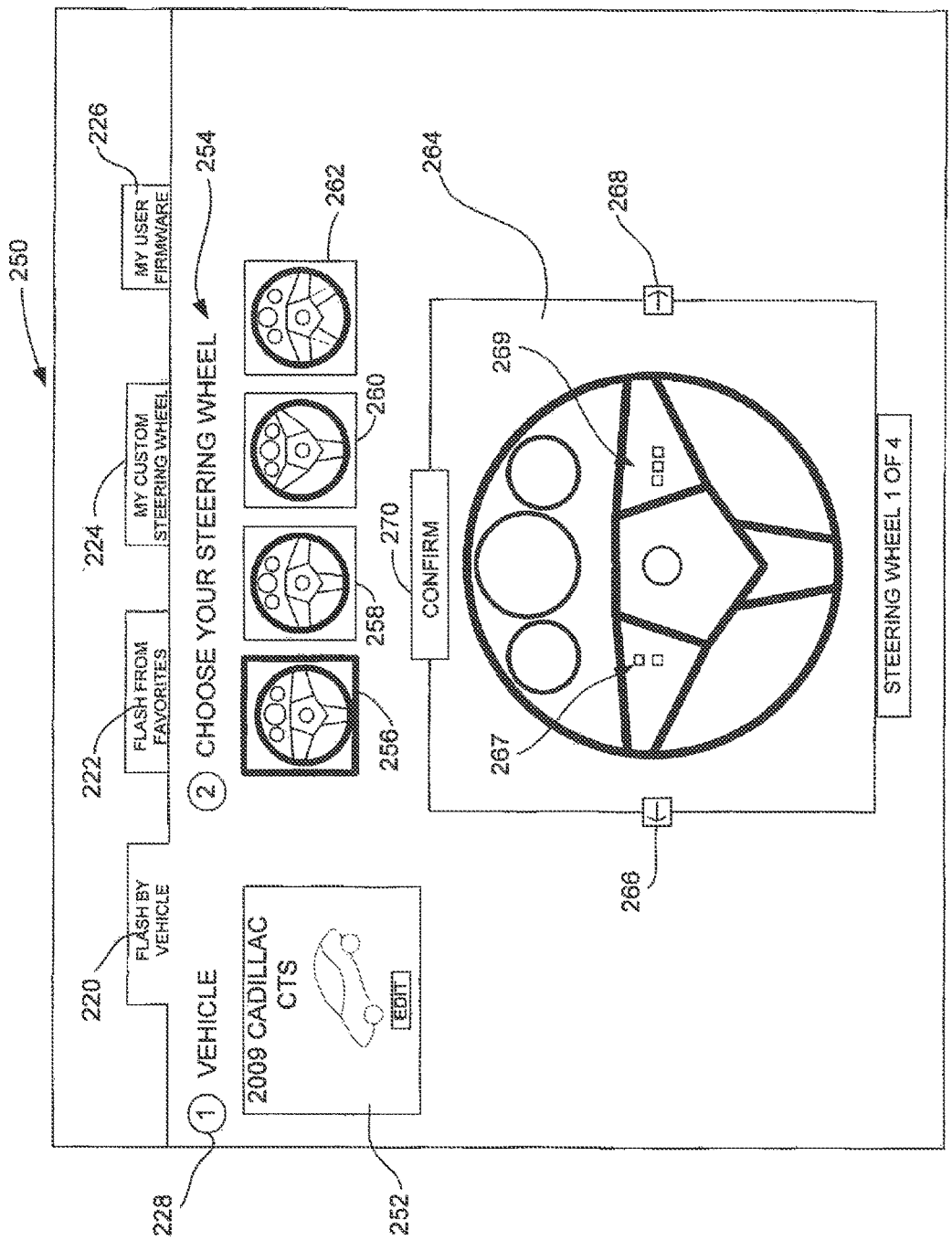
FIG. 7 is an illustrative example of web pages that may be generated by the system, pertaining to displaying an OEM steering wheel and respective steering wheel controls as a result of selecting the vehicle make, year and model.
Figure 8:
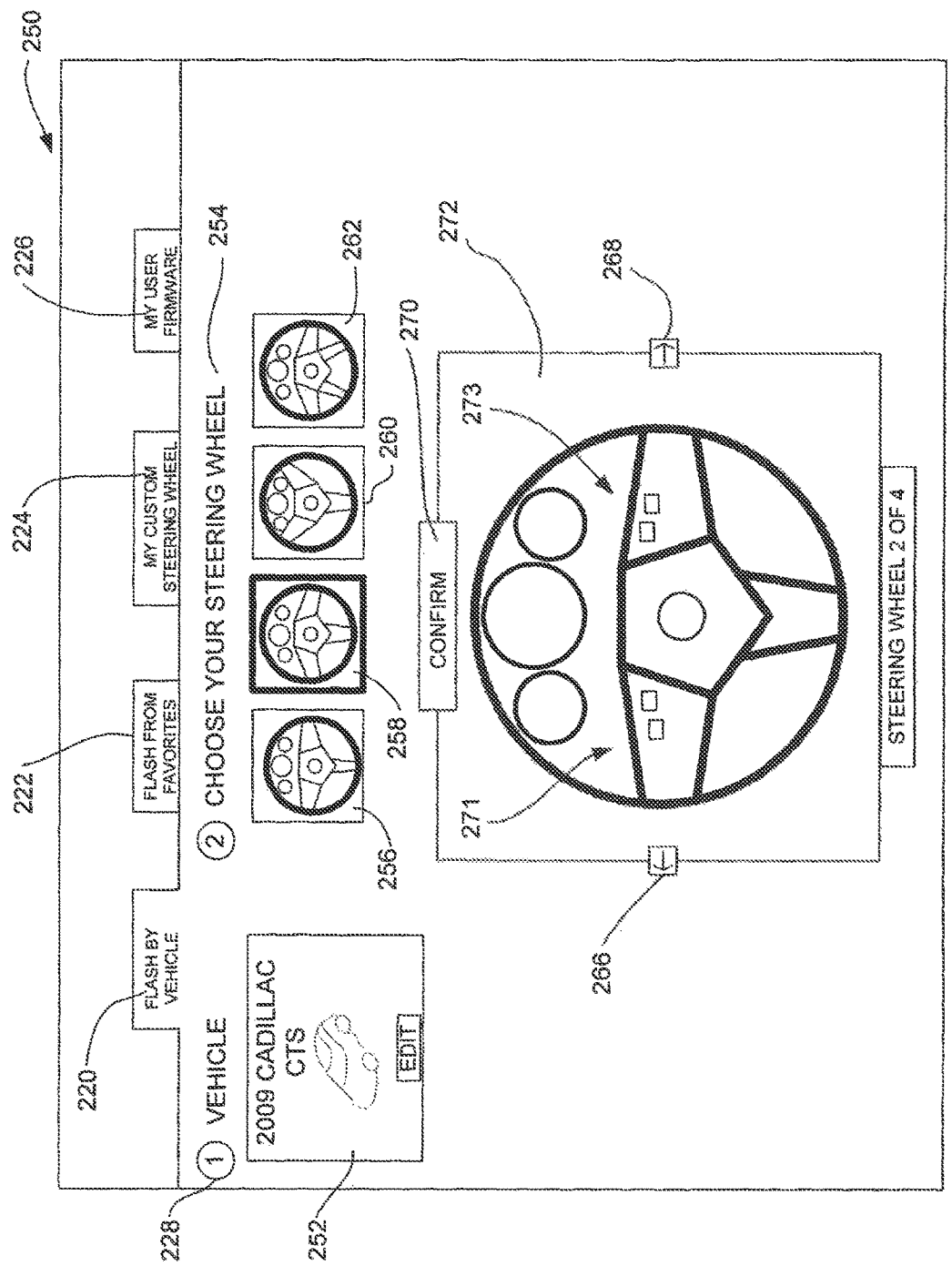
FIG. 8 is an illustrative examples of web pages that may be generated by the system, pertaining to a first alternative steering wheel and steering wheel controls.
Figure 9:
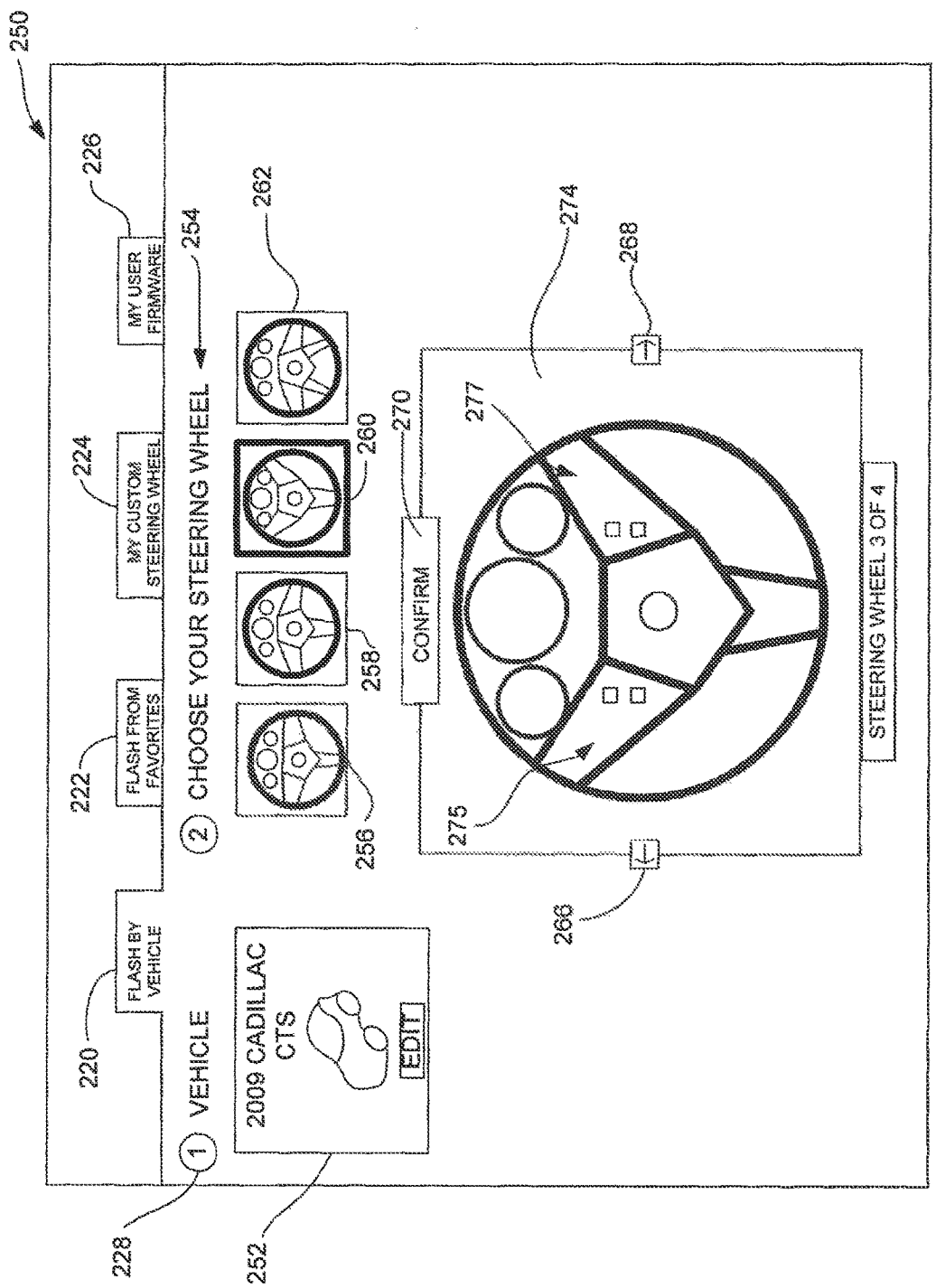
FIG. 9 is an illustrative example of web pages that may be generated by the system, pertaining to a second alternative steering wheel and respective steering wheel controls.
Figure 10:
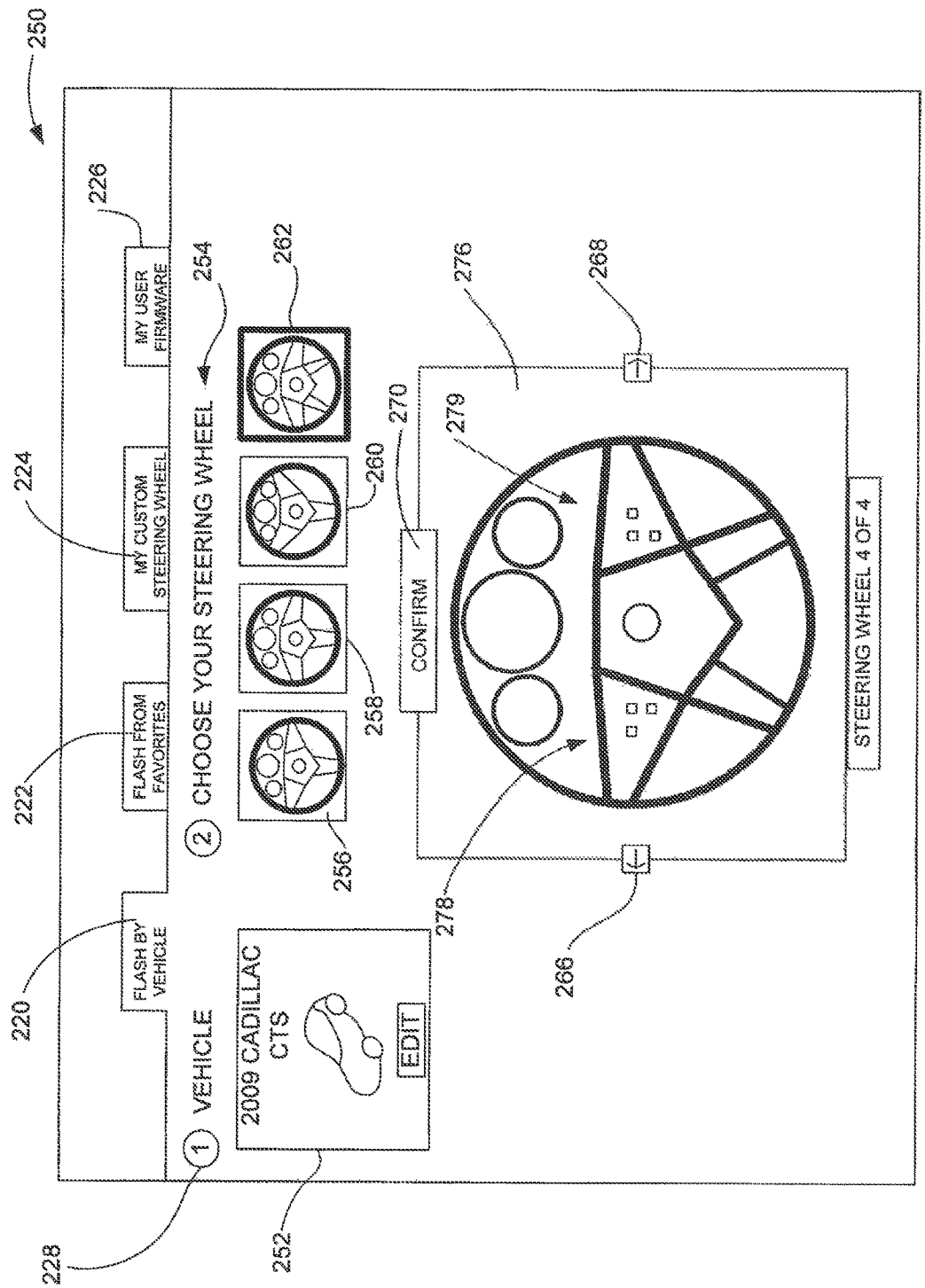
FIG. 10 is an illustrative example of web pages that may be generated by the system, pertaining to a third alternative steering wheel and respective steering wheel controls.

In FIG. 7, it can be seen that the system serves up web page 250, which includes a vehicle pane 252 with an icon or photograph, for example, that identifies the vehicle model, year and make previously selected by the user. The system then permits a user to select a steering wheel by displaying icons or photos of the OEM steering wheels available in the vehicle selected and identified in vehicle pane 252. The OEM steering wheels 256, 258, 260, 262 are displayed in a row 254. For example, there may be four different OEM steering wheels that were available as illustrated in FIGS. 7-9. As illustrated, each steering wheel has a different arrangement of steering wheel controls that will operate the aftermarket radio.

As a user clicks on one of the steering wheels 256, 258, 260, 262, a larger image of the selected steering wheel is displayed. For example, in FIG. 7, a user selected the left most steering wheel 256 from the row 254 of steering wheels, which then a larger image 264 is displayed of the smaller image 256. The larger image 264 may include left side steering wheel controls 267 and right side steering wheel controls 269. The user may click a confirm button 270 if the steering wheel and steering wheel controls displayed is the OEM steering wheel that will be configured to function with the aftermarket stereo.

Alternatively, the user may scroll through to the additional steering wheels using a forward arrow 268 or back arrow 266, as illustrated in FIG. 8 for example. Referring to FIG. 8, a larger image 272 of another steering wheel 258 is displayed. The user is able to view the steering wheel 272 to determine if that is the steering wheel that is in their vehicle and will be used to operate the aftermarket radio. Selecting a steering wheel based on the user viewing an image of the actual steering wheels, provides a quick and easy system and method that eliminates mistakes in configuring steering wheel controls to function with an aftermarket radio.

The next steering wheel 260 has been selected by the user as illustrated in FIG. 9. The larger steering wheel image 274 is displayed and the user can verify whether the steering wheel controls 275, 277 are those that are in the vehicle in which the aftermarket stereo is installed. If the steering wheel image 274 is not the desired steering wheel, then the user may select the forward arrow 268 or back arrow 266 to move to the next steering wheel. Once the user determines that the selected steering wheel includes the steering wheel controls that are to be configured, the user may click the confirm button 270 to move to configuring a function of each of the steering wheel controls.

After the user clicks the forward arrow 268, the fourth available OEM steering wheel 276 is displayed. As explained above, the larger image 276 displays the steering wheel controls 278, 279 so that the user may determine whether the steering wheel selected is the appropriate steering wheel. The confirm button 270 may be clicked by the user if this particular steering wheel image 276 represents the steering wheel controls to be configured. Otherwise, the user may select the back button 266 to go back and view the previous steering wheels 256, 258, 260.

Figure 11:
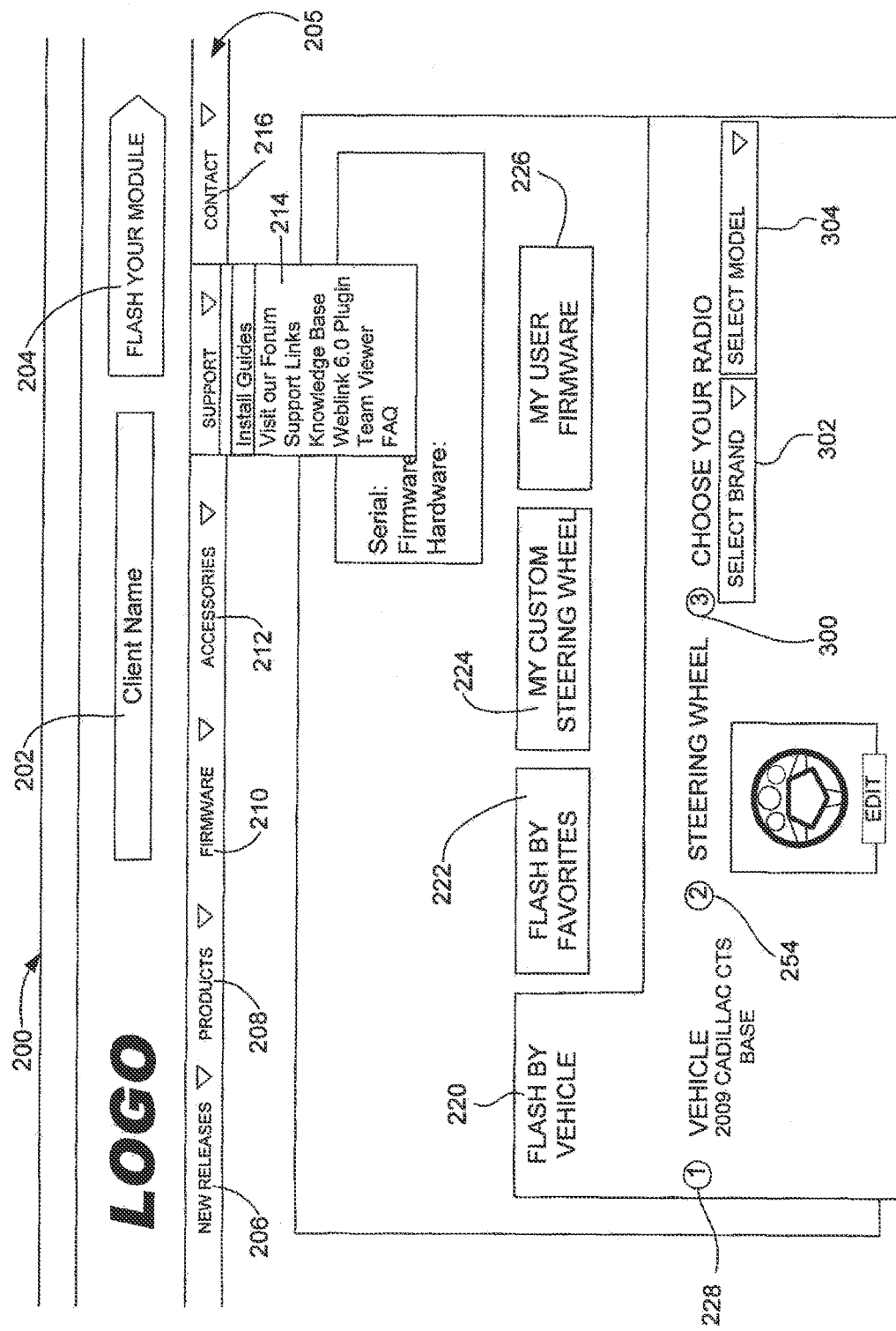
FIG. 11 is an illustrative example of web pages that may be generated by the system, pertaining to configuring the interface module by selecting an aftermarket radio.
Figure 12:
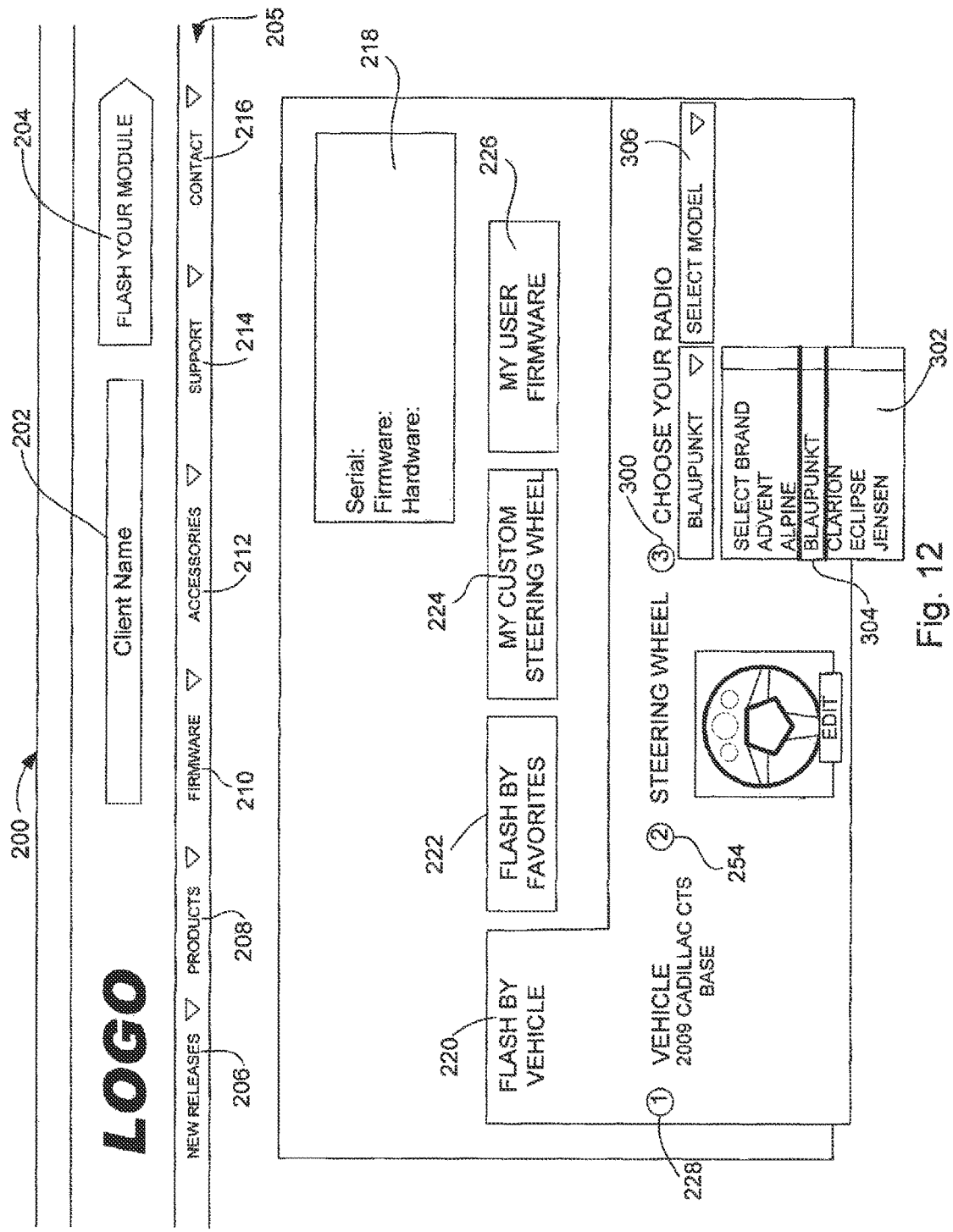
FIG. 12 is an illustrative example of web pages that may be generated by the system, pertaining to configuring the interface module by selecting a particular brand of radio.

In FIG. 11 after selecting the vehicle 228 and the desired steering wheel 254, the system may permit the user to choose the particular aftermarket radio 300 using drop down menus that may be served up by the system. For example, the user may click on "Select Brand" 302 and "Select Model" 304 buttons. It can be seen in FIG. 12 that the radio dropdown menu 302 displays a list of available radio brands to permit a user to select. A position confirmation indicator provides confirmation of what brand has been selected and is currently active, which now indicates in FIG. 12 that "Blaupunkt" has been selected, for example.

Figure 13:
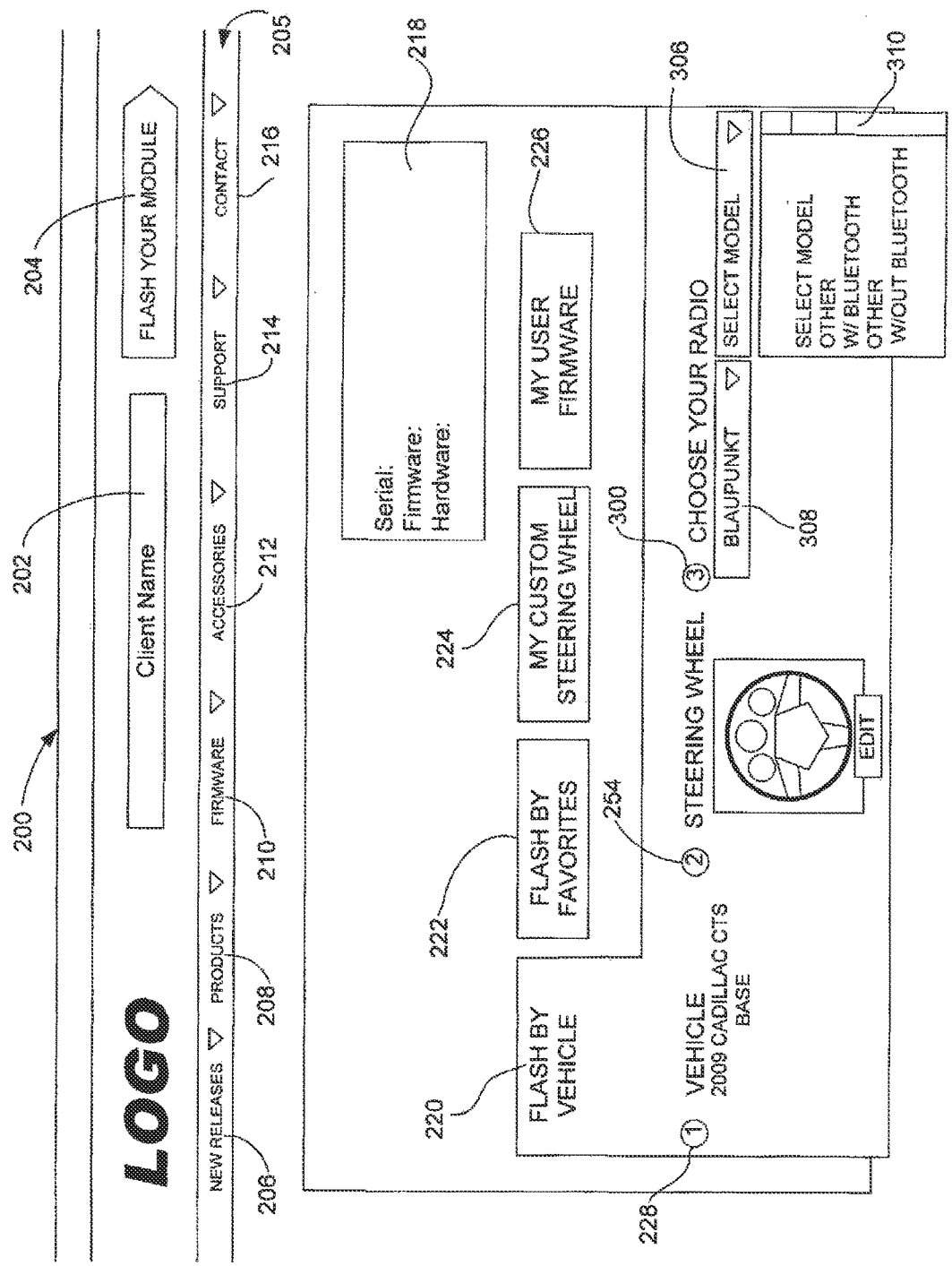
FIG. 13 is an illustrative example of web pages that may be generated by the system, pertaining to configuring the interface module by selecting a particular model of the radio.
Figure 14:
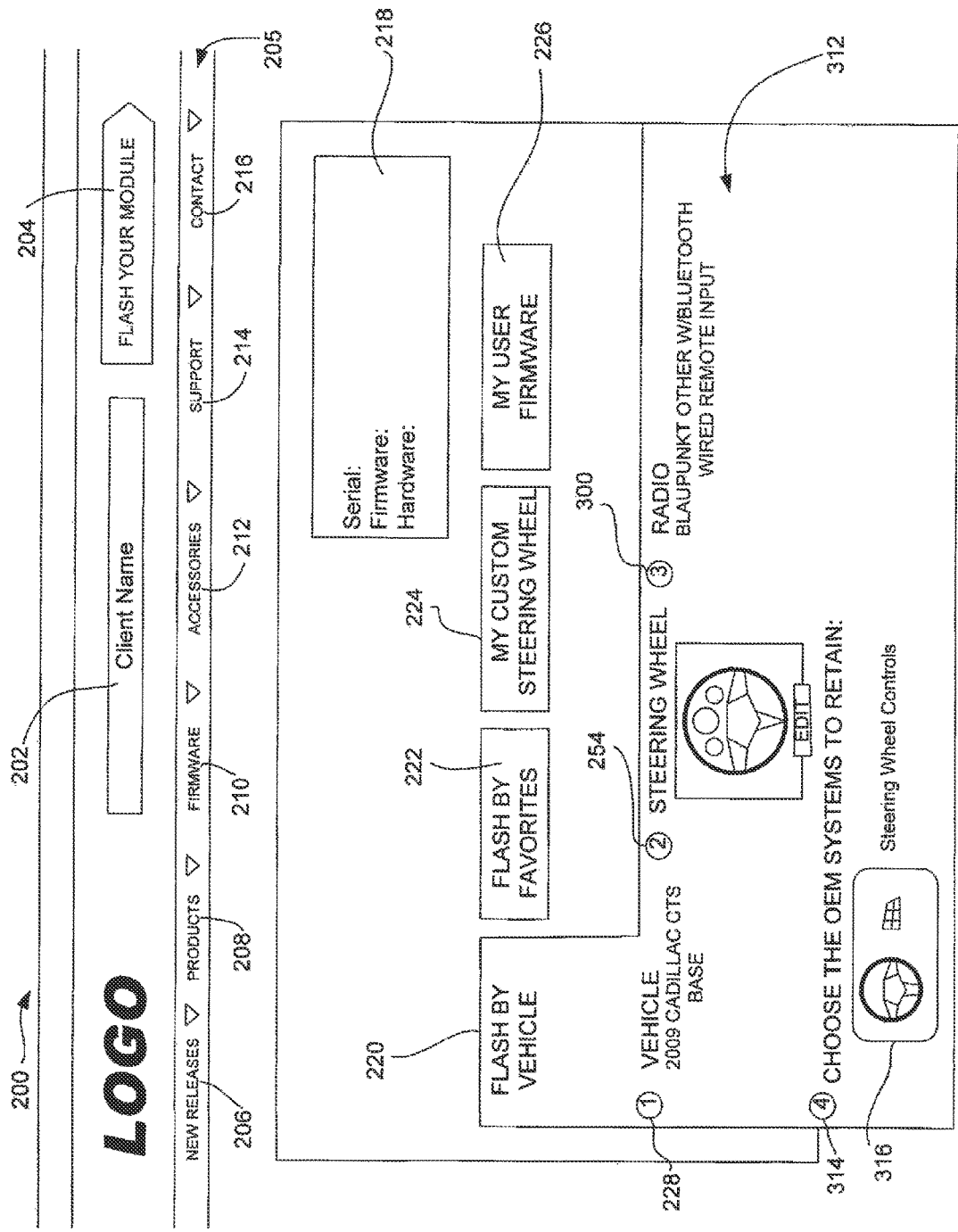
FIG. 14 is an illustrative example of web pages that may be generated by the system, pertaining to displaying OEM systems to retain.

Moving to FIG. 13, a radio model dropdown menu 310 may be provided that may be served up by the system. It can be seen that the radio model dropdown menu 310 displays a list of available models of the radio to permit a user to select. After selecting, the radio brand and model is displayed 312 to the user as illustrated in FIG. 14.

The system permits the user to select which OEM systems to retain 314. In pane 316, the selected steering wheel and controls may be selected and move to configuring each of the steering wheel controls as illustrated in FIG. 15.

Figure 15:
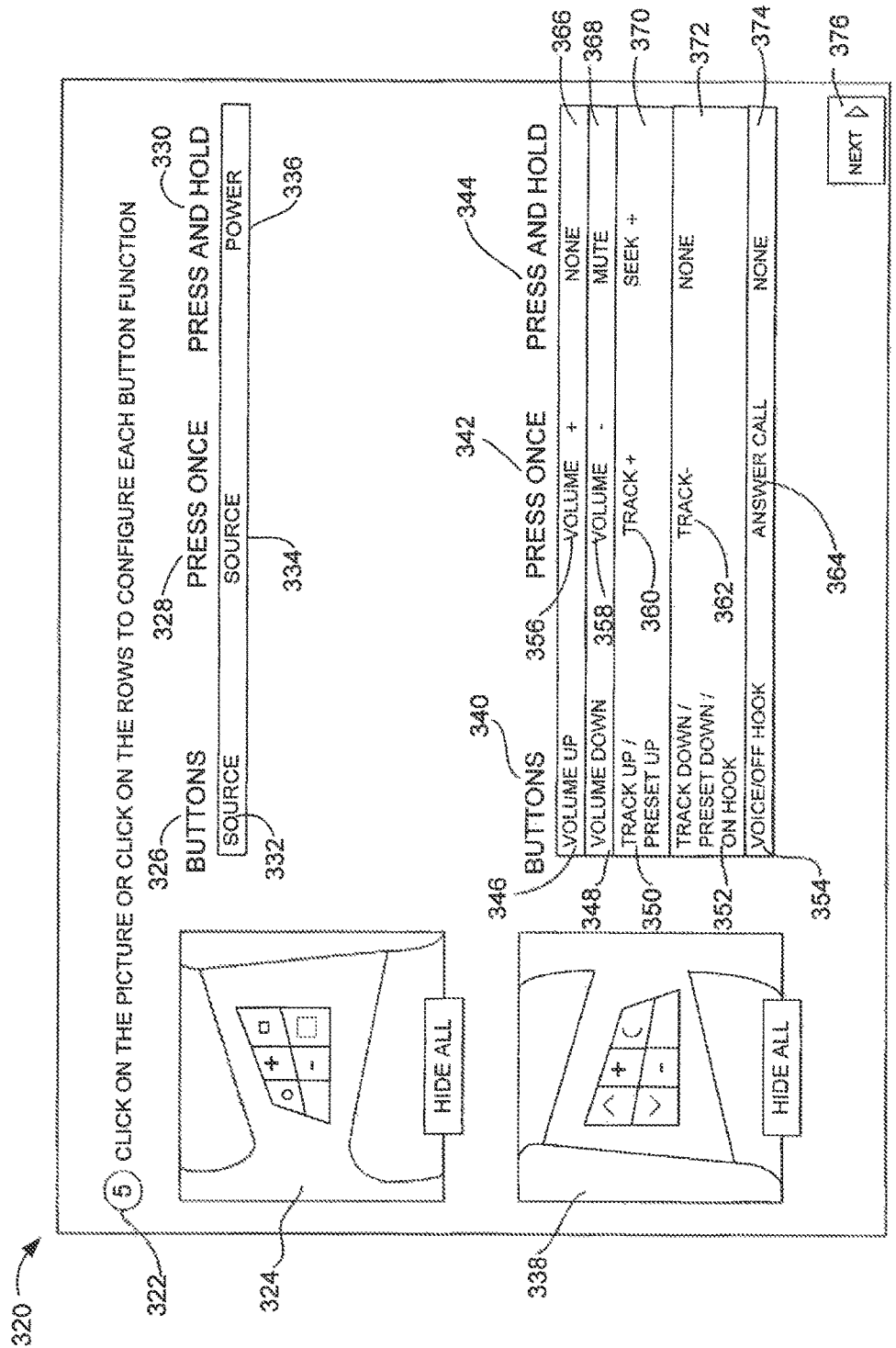
FIG. 15 is an illustrative example of web pages that may be generated by the system, pertaining to displaying the selected steering wheel and respective steering wheel controls.

As shown in FIG. 15, web page 320 may be served up by the system and include information pertaining to a number of different steering wheel controls 324, 338 to be configured 322. In some instances, it may be desirable to obtain greater information regarding a specific steering wheel control. Each steering wheel control (i.e., button) may be labeled using any appropriate nomenclature. For example, a steering wheel control may be labeled in accordance with its physical location on the steering wheel or any other desired naming system or plan.

By reading a row across the columns 326, 328, 330, one can see that each steering wheel control function is displayed for controls on the left side of the steering wheel 324. For example, the first column has a steering wheel control labeled as "Source" 332. The next column 328 indicates that if the steering wheel control is pressed once, that the "source" function is activated. The next adjacent column 330 indicates that if the steering wheel control is pressed and held 330, that the "power" function is activated. Similarly, controls on the left side of the steering wheel 338 are displayed on web page 320 with functions of each steering wheel control in rows and columns. In the first column of "Buttons," each button that is available to be configured is listed. For example, the buttons (i.e., steering wheel controls) may include "Volume Up," "Volume Down," "Track Up/Preset Up," "Track Down/Preset Down/On Hook," and "Voice/Off Hook." Moving to the next adjacent column 342, a first function is identified to be operative when the respective button is pressed once and a second function when the respective button is pressed and held. It can be seen that the functions currently assigned to the steering wheel controls were configured by the OEM and intended to work with the OEM radio.

In addition, non-media orientated controls can also be configured to control their primary function as well as configured with additional functions to control an aftermarket radio. For example, the steering wheel may only have cruise control buttons. The system and method allows the cruise control buttons to be configured with an additional function to also control audio. For example, the cruise control button will perform its primary function, but can also be configured to control the audio when the cruise control button is held down or using a pre-determined number of presses.

Figure 16:
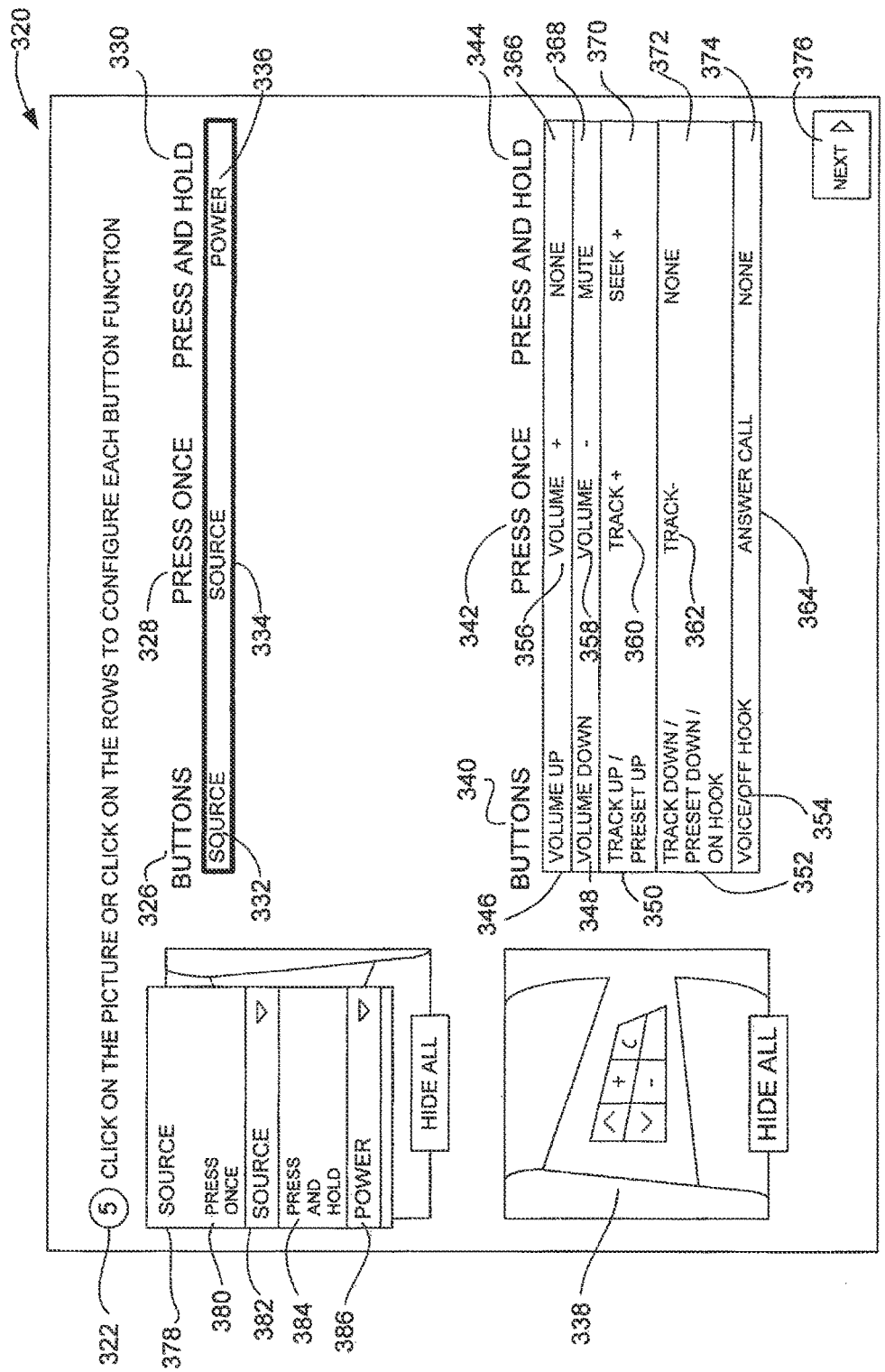
FIG. 16 is an illustrative example of web pages that may be generated by the system, pertaining to selecting a function to be assigned to each steering wheel control located at a first location on the steering wheel.

The user moves a curser over one of the steering wheel controls or the row with the listed button that is intended to be configured to operate with the aftermarket radio. Referring to FIG. 16, the "Source" button 332, for example, has been selected to be configured and a dropdown menu 378 is displayed. The dropdown menu 378 indicates that the "Source" button pressed once 380 will control the source 382 and allow the user to scroll the available sources by pressing the button in succession. Likewise, the dropdown menu 378 indicates that the "Source" button pressed and held down 384 will control the power 386 to the radio.

Figure 17:
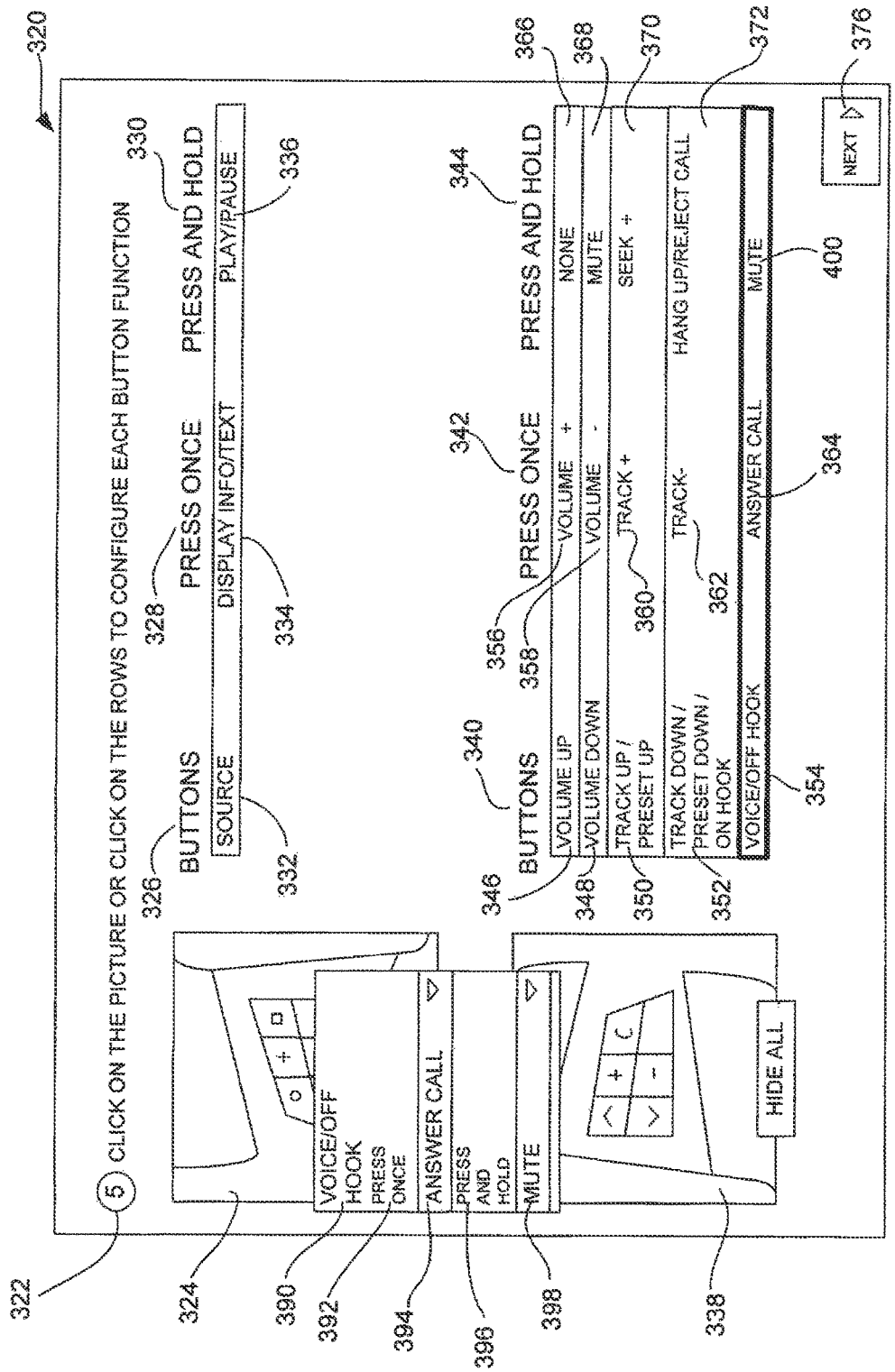
FIG. 17 is an illustrative example of web pages that may be generated by the system, pertaining to selecting a function to be assigned to each steering wheel control located at a second location on the steering wheel.

Moving to the right side steering wheel controls, a position confirmation indicator provides confirmation of what button has been selected and is currently active, which now indicates in FIG. 17 that the "Voice/Off Hook" has been selected. A drop down menu 390 is displayed and indicates when the "Voice/Off Hook" is pressed once is configured to answer a telephone call. The "Voice/Off Hook" button was previously not configured to have any function when the button was pressed and held as can be seen in FIG. 16. However, the system expands the functionality of each button by allowing at least two functions to be assigned to it as illustrated in FIG. 17. The "Voice/Off Hook" button has now been configured and assigned a second function of "mute" when the button is pressed and held. The steering wheel controls 324, 338 can each be configured to provide at least two functions.

Figure 18:
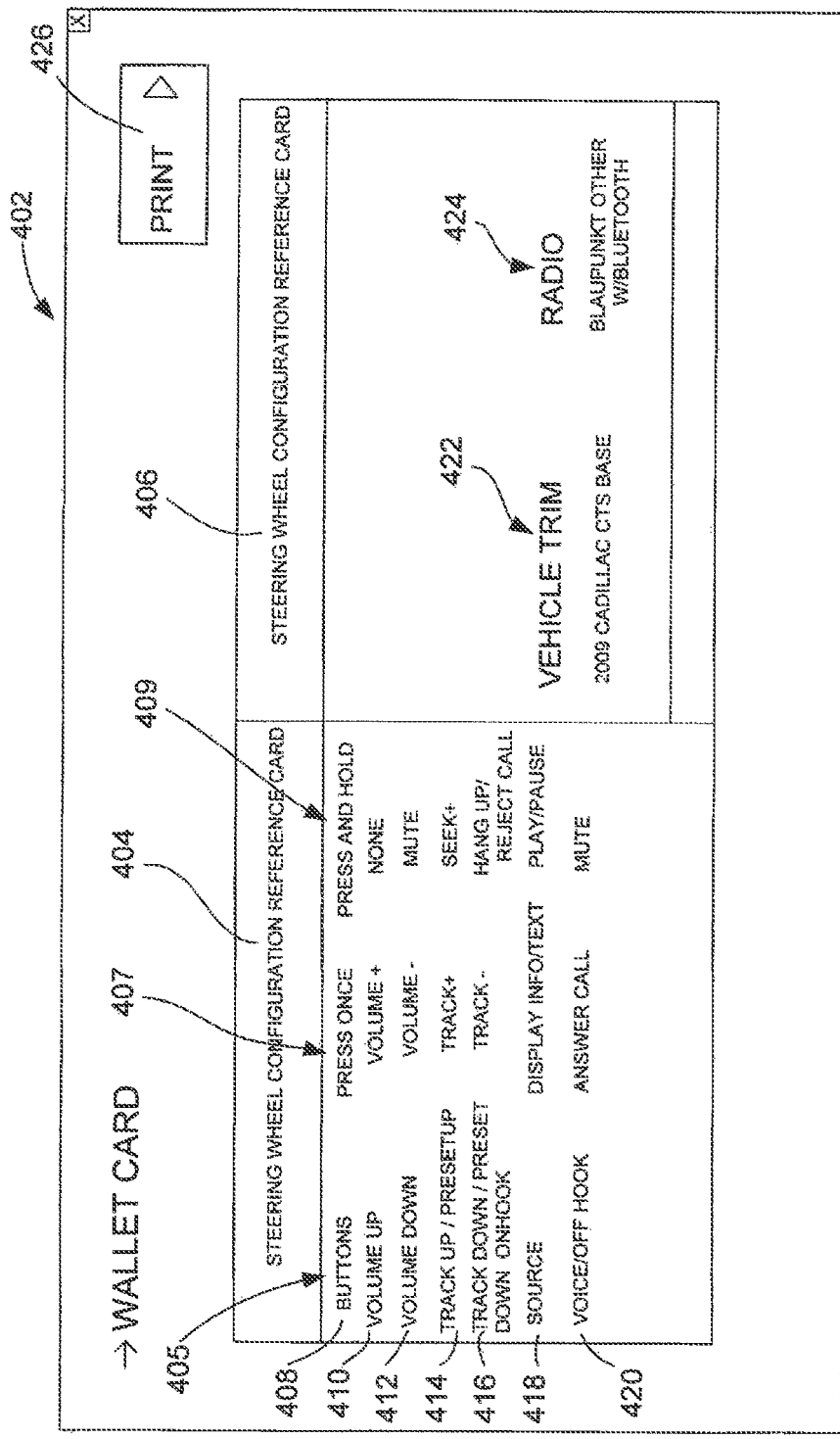
FIG. 18 is an illustrative example of a wallet card that displays a summary of each function assigned to each steering wheel control.

Referring now to FIG. 18, a wallet card 402 may be generated to memorialize the configuration of the steering wheel controls for future reference. It can be seen that a first heading 404 contains the functions assigned to each of the steering wheel controls and a second heading 406 includes the particular information of the vehicle and aftermarket radio. A first column 405 identifies each of the buttons 408, which includes in the illustrative embodiment of "Volume Up" 410, "Volume Down" 412, "Track Up/Presetup" 414, "Track Down/Preset Down Onhook" 416, "Source" 418, and "Voice/Off Hook" 420. Reading across each row associated with each button, it can be seen the functions assigned and configured to each button 410, 412, 414, 416, 418, 420. For example, under the column 407 to press the "Source" button 418 once, the "Display Info/Text" function is toggled and under the adjacent column when the "Source" button 418 is pressed and held, the "Mute" function of the radio is toggled. The wallet card 402 also includes the vehicle information 422 of make, year and model 422. The radio information 424 includes the brand and model. A print button 426 permits a user to print the wallet card 402 with the configuration of the steering wheel controls.

The interface module is connected to the GUI via the computer and flash programmed with the particular control signal configuration generated by the GUI, which is based on the user selections for the OEM controls and aftermarket electronics described above. The interface module will then cause the OEM controls to operate the aftermarket electronics in accordance with the user's selections when connected to the aftermarket electronics and the OEM controls.

Figure 19:
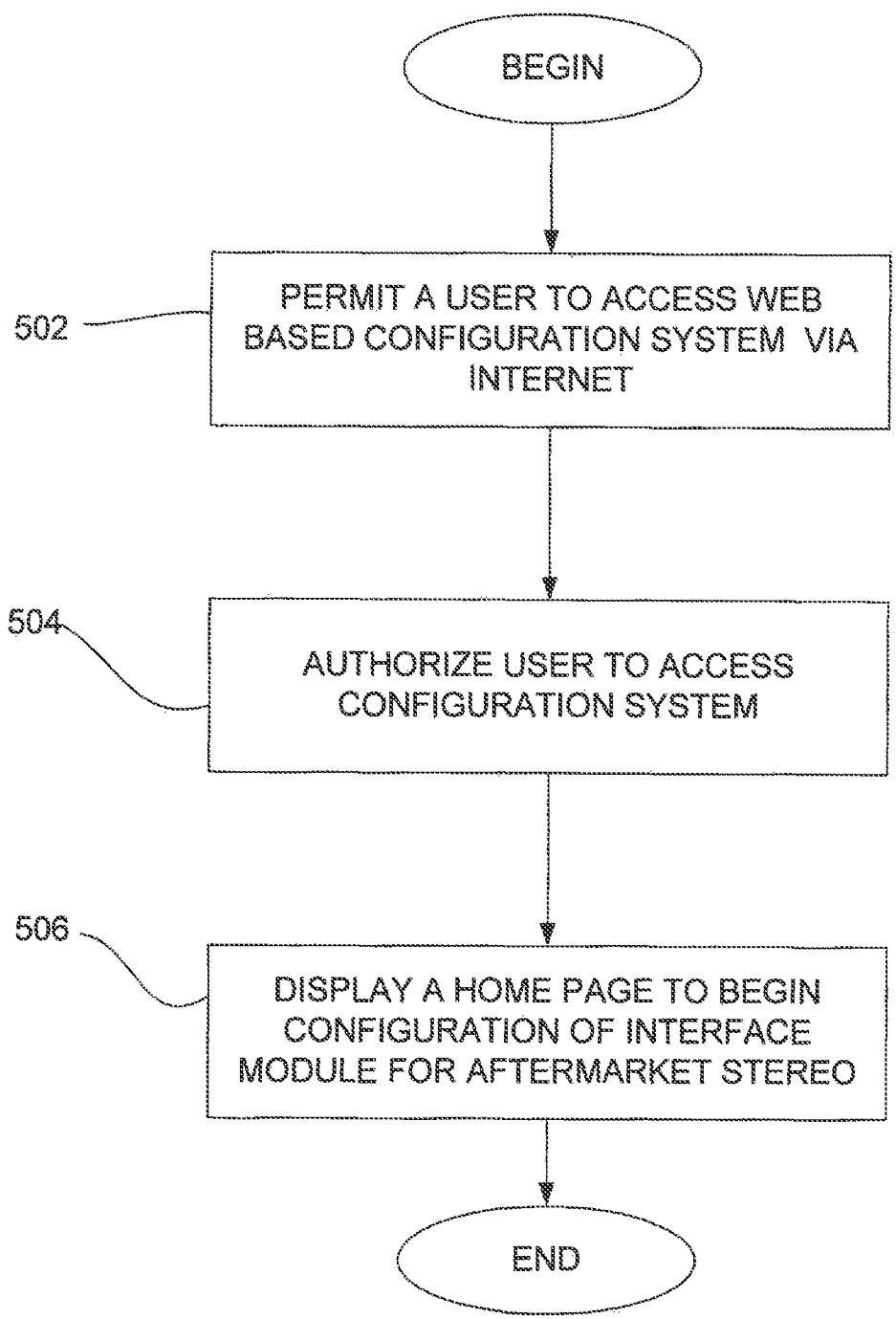
FIG. 19 is a flow diagram providing an illustrative but non-limiting example of a method of accessing a GUI used to configure OEM controls.

Referring now to FIG. 19, a particular illustrative method of accessing a graphical user interface (GUI) used in configuring steering wheel controls for an aftermarket radio is described. The method permits a user, at 502, to access a web based configuration system via the Internet. Continuing to 504, the user is authorized to access the configuration system. A home page is displayed to begin configuration of an interface module for an aftermarket stereo, at 506.

Figure 20:
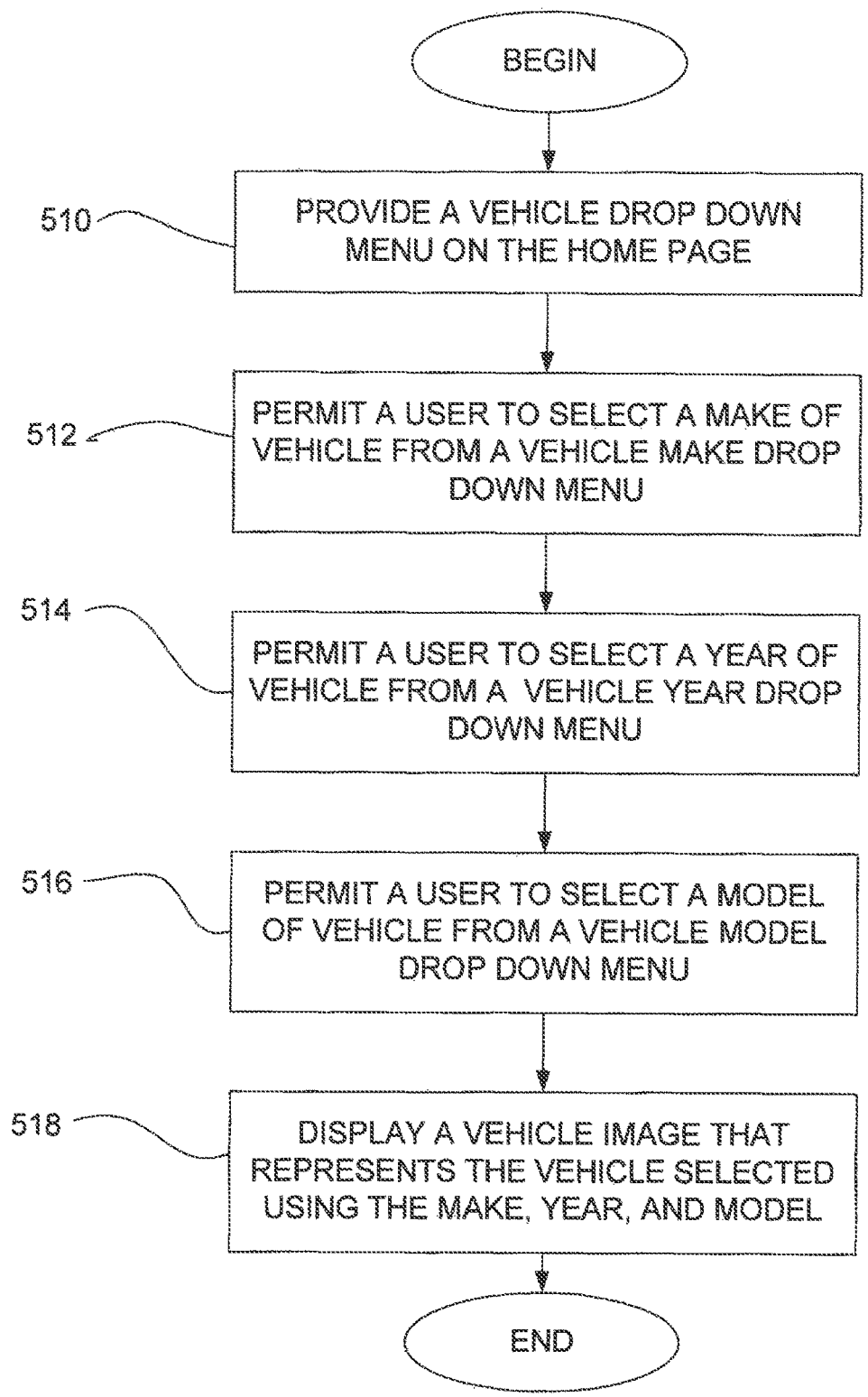
FIG. 20 is a flow diagram providing an illustrative but non-limiting example of a method to select a vehicle in which the aftermarket electronics are to be installed.

FIG. 20 describes a method to select a vehicle in which the aftermarket radio is to be installed. At 510, a vehicle dropdown menu is provided on a home page of the GUI. A user is permitted to select a make of a vehicle from a vehicle make dropdown menu, at 512. Moving to 514, a user is permitted to select a year of the vehicle from a vehicle year dropdown menu. Continuing to 516, a user is permitted to select a model of the vehicle from a vehicle model dropdown menu. A vehicle image is displayed that represents the vehicle selected using the vehicle make, year, and model selected previously, where the user may confirm that the image is that of the steering wheel and controls that are to be configured.

Figure 21:
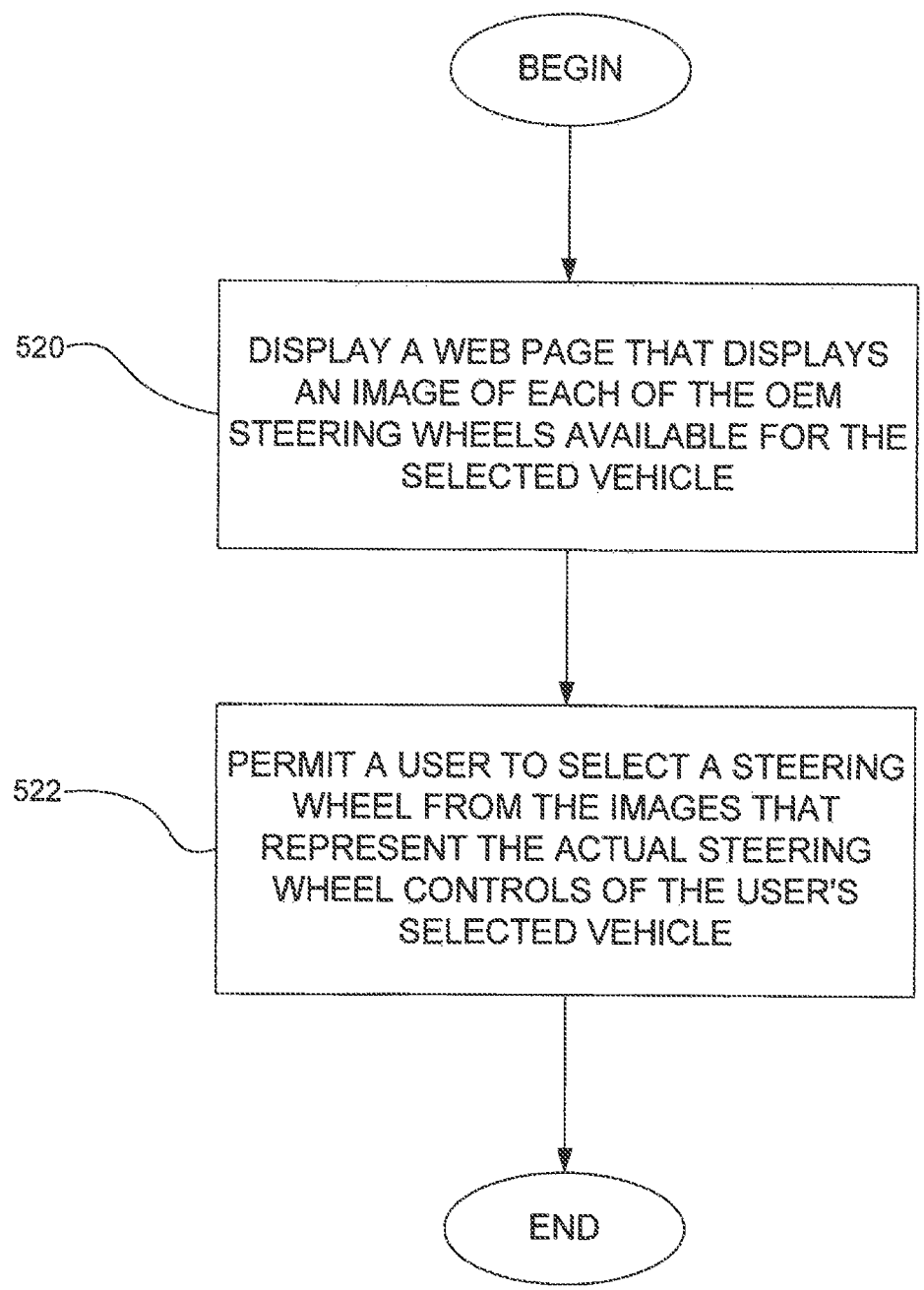
FIG. 21 is a flow diagram providing an illustrative but non-limiting example of a method that may be carried out using the system to remotely configure an aftermarket interface module using a graphical user interface.

FIG. 21 describes a method to display a web page that displays an image of each of the OEM steering wheels available for the selected vehicle, at 520. At 522, a user is permitted to select a steering wheel from the images that represent the actual steering wheel controls of the user's selected vehicle. If a particular vehicle or steering wheel is not listed, the method permits a user to select the firmware button 210 described above to generate custom firmware for the interface module to operate with a non-listed vehicle or steering wheel. This is accomplished by taking measurements of the steering wheel controls by using a multi-meter, or other similar means, to determine resistance values, for example. The measurements are entered using the GUI, which can then automatically generate the appropriate custom firmware for the module to perform properly in the vehicle. The user is able to download the custom firmware and configure the steering wheel controls using the GUI. Accordingly, the method and system may be used with old, new, or unusual vehicles without waiting for firmware updates from the manufacturer that must be written by engineers, rather than automatically generated as in the present method and system.

Figure 22:
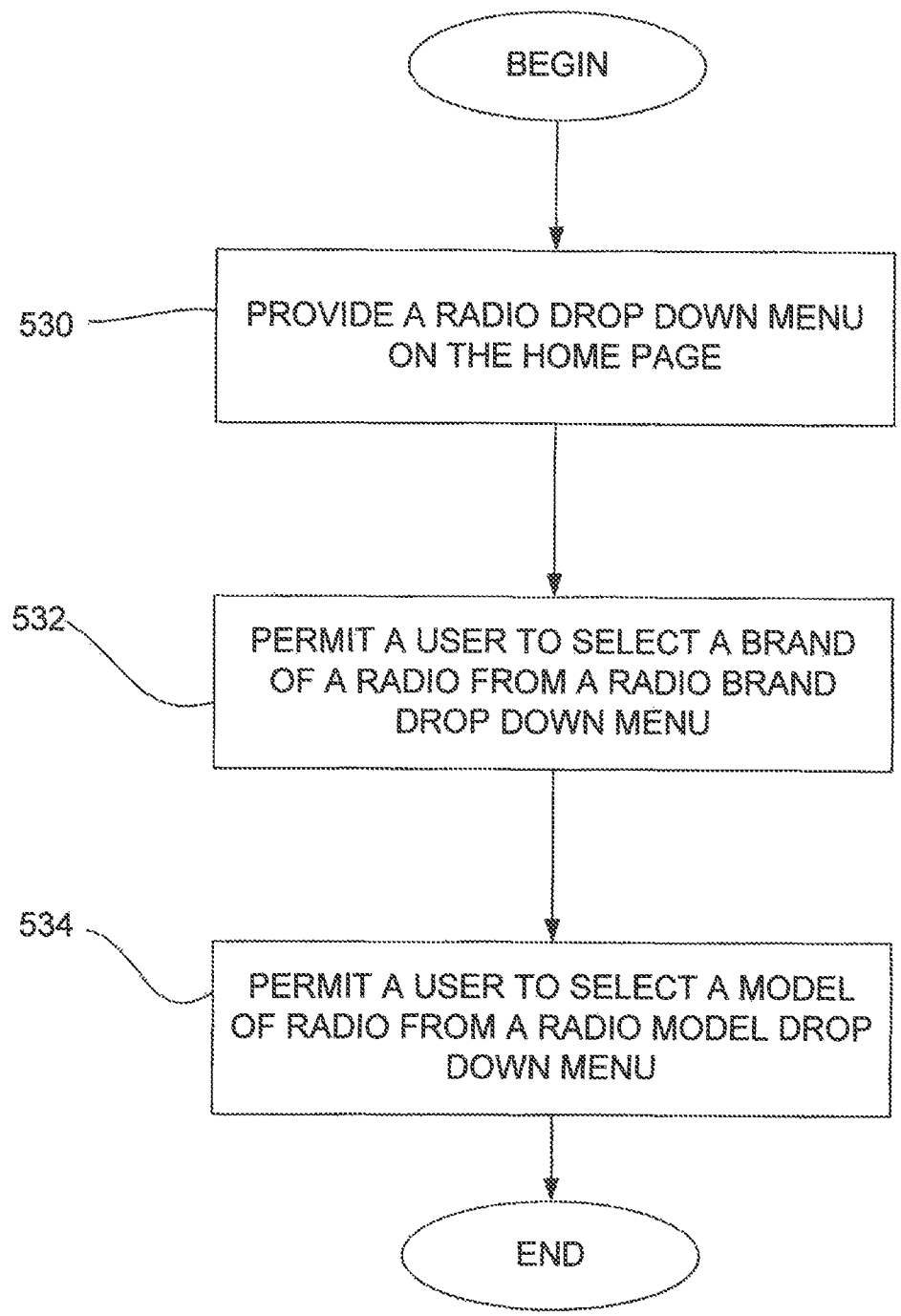
FIG. 22 is a flow diagram providing an illustrative but non-limiting example of a method to permit a user to select a particular aftermarket electronic device.

FIG. 22 describes a method to permit a user to select a particular aftermarket radio that will be installed in the vehicle and the steering wheel controls configured to operate that particular aftermarket radio. At 530, a radio drop down menu is provided on the home page of the GUI. Moving to 532, the user selects a brand of radio from a radio drop down menu. The user selects a model of the radio from the radio model drop down menu, at 534.

Figure 23:
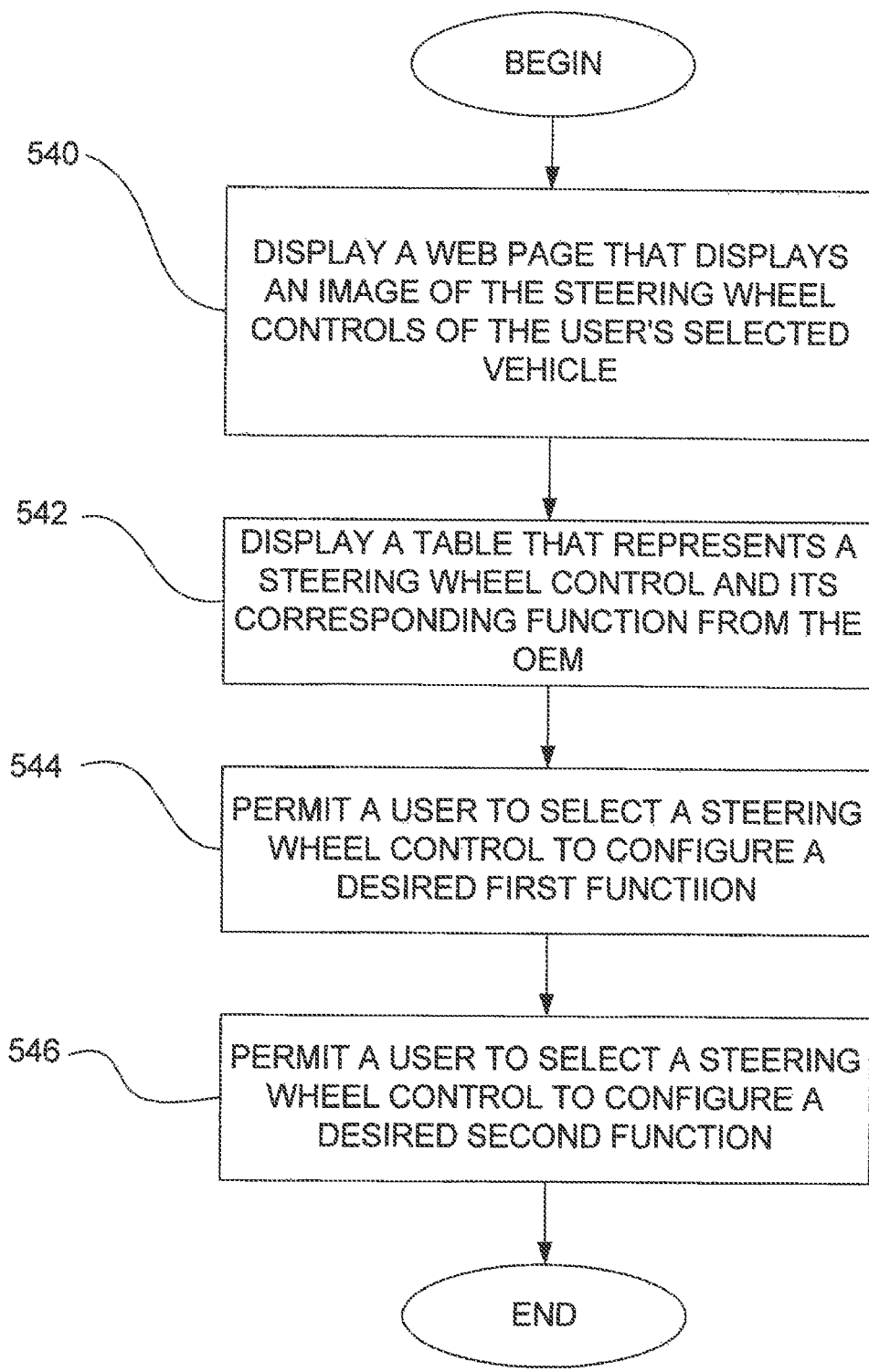
FIG. 23 is a flow diagram providing an illustrative but non-limiting example of a method to select the OEM controls of the particular vehicle to configure and assign particular functions.

FIG. 23 describes a method to select the steering wheel controls of the particular vehicle to configure and assign particular functions. At 540, a web page is displayed that displays an image of the steering wheel controls of the user's selected vehicle. A table is displayed, at 542, that represents each steering wheel control a particular steering wheel control (e.g., button) from the image, or the table, to configure and assign a desired first function. The user may also configure a second function to that particular steering wheel control, at 546. For example, the first function is activated when the steering wheel control is pressed once. The second function is activated when the steering wheel control is pressed and held. Each steering wheel control may be configured in a similar fashion.

Figure 24:
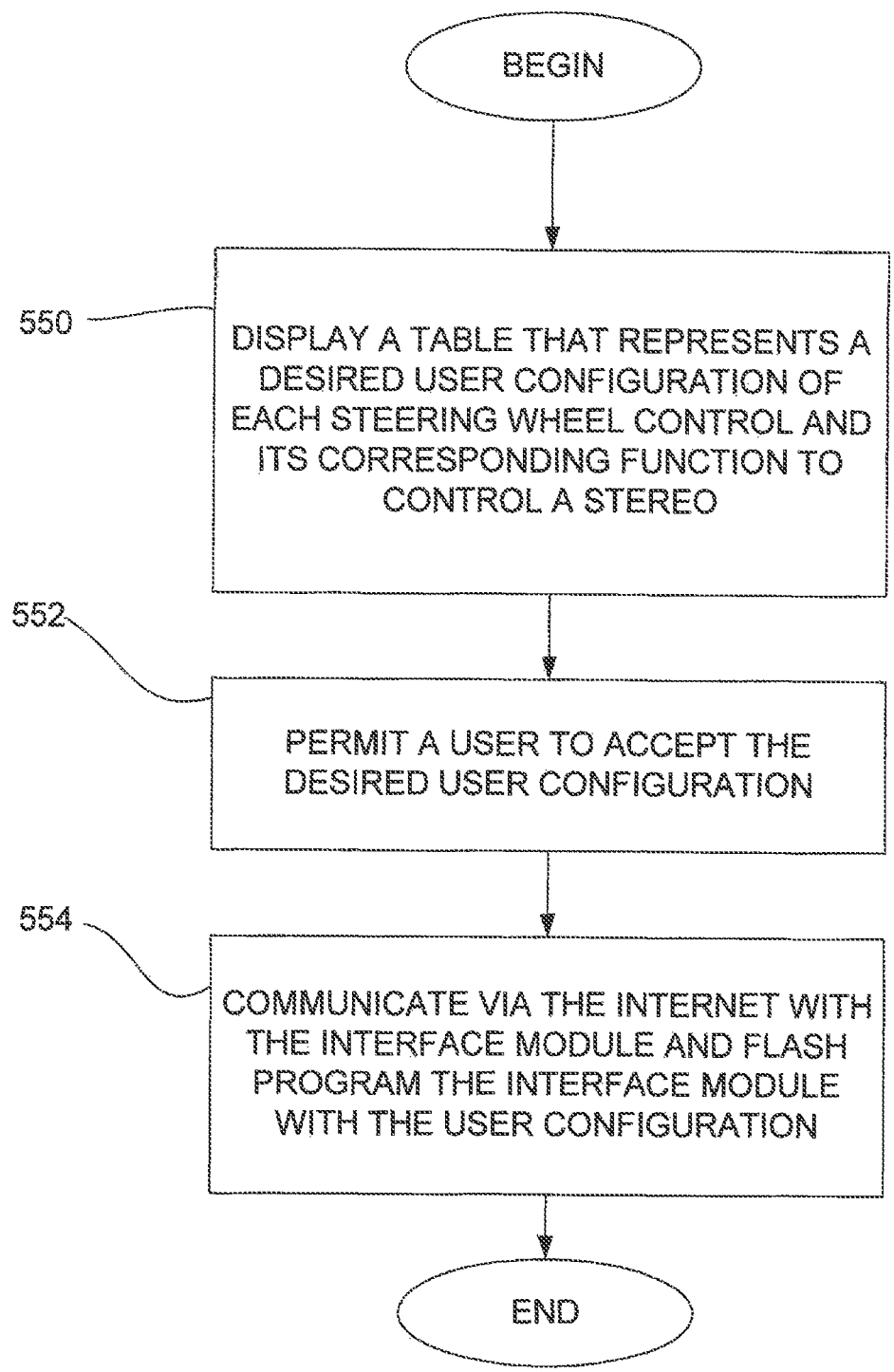
FIG. 24 is a flow diagram providing an illustrative but non-limiting example of a method to flash program the interface module with a customized OEM control configuration to operate with a particular vehicle and aftermarket electronics.

FIG. 24 describes a method to flash program the interface module with a customized steering wheel control configuration to operate with a particular vehicle and radio. At 550, a table is displayed that represents a desired user configuration of each steering wheel control and its corresponding function to control the radio. The user, at 552, accepts or rejects the desired user configuration that is displayed. Continuing to 554, the interface module is flash programmed with the user configuration via the Internet. Once the interface module has stored the user configuration, the interface module is adapted to receive signals from each steering wheel control and transmit to and control the functions of the aftermarket stereo.

Figure 25:
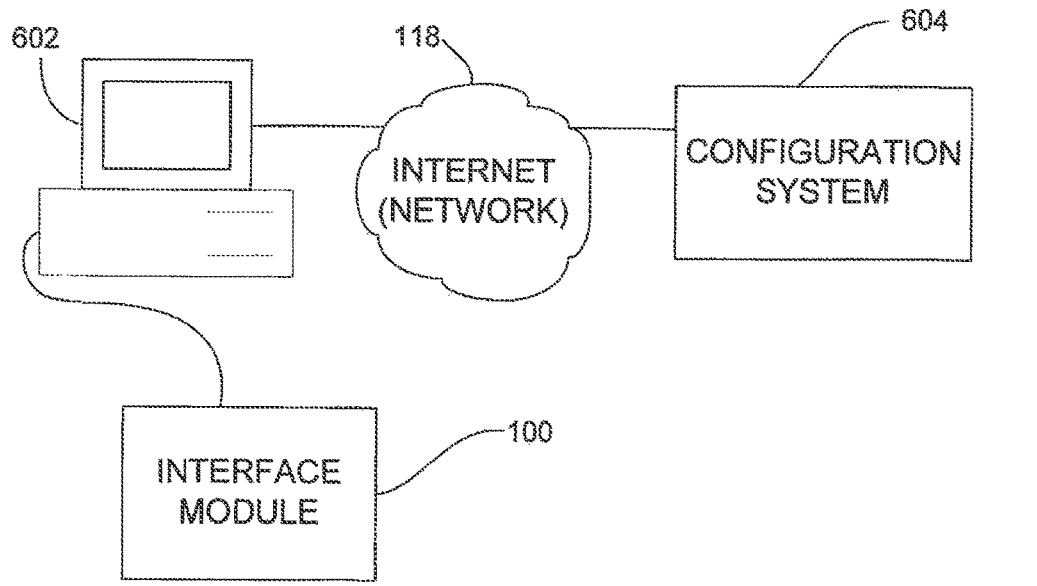
FIG. 25 is a schematic of an illustrative embodiment of a system to remotely configure an aftermarket interface module using a graphical user interface.

A schematic of a particular illustrative embodiment of the system is shown in FIG. 25. As described above, the system includes an interface module 100 that is used to receive and transmit OEM control signals to control an aftermarket electronics device. The interface module 100 is connected to a computer 602. The connection can be through a USB connection, wirelessly, or some other connection. The computer 602 is connected to the configuration system 604 (the "GUI") through a communications network 118 such as the Internet or an intranet. The configuration system 604 refers to the system and method described above in FIGS. 3-24 used to generate and transmit the control signal configuration to the interface module 100 that allows the OEM controls to control an aftermarket electronics device. The configuration system 604 may reside on the local compute 602 or on a remote server. The configuration system 604 may be updated with the most recent configuration data required for OEM controls to control aftermarket electronics. Accordingly, any user can access the configuration system to obtain the most recent configuration data irrespective when the interface module was manufactured or released for sale. The interface module is relatively static with the contemporaneously updating occurring through the configuration system 604.

Figure 26:
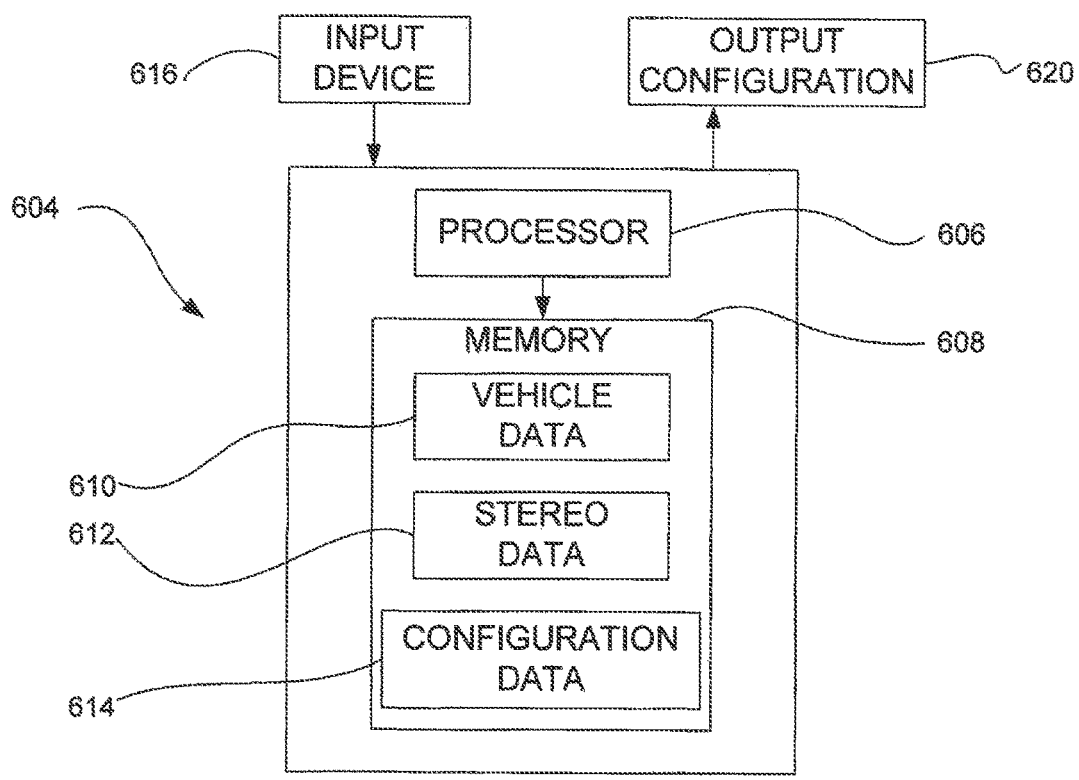
FIG. 26 is a block diagram of a particular illustrative embodiment of a system to remotely configure an aftermarket interface module using a graphical user interface.

A block diagram of a particular illustrative embodiment of the configuration system 604 is disclosed in FIG. 26. The configuration system 604 (the "GUI") includes a computing device having at least one processor 606 and a memory 608 that is accessible to the processor 606. The memory 608 includes media that is readable by the processor 606 and that stores vehicle data 610, stereo data 612 (i.e., aftermarket electronics), configuration data 614 and program instructions that are executable by the processor 606. Additionally, the computing device includes at least one means of user input 616, either keyboard, mouse, light pen, track ball, track pad, joy stick, graphics tablet, touch screen, or other GUI pointing device or any combination thereof that is accessible to the processor 606. Additionally, the computing device 110 having at least one means of user display, either a cathode ray tube (CRT) display, liquid crystal display (LCD), light emitting diode (LED) display, plasma display, or other GUI display device that is accessible to the processor 606. Additionally, the processor 606 monitors, processes and reacts to user input from the input device 616 and displays screen pointer movements and GUI elements using a display, synchronizes the user pointer input actions to the GUI output actions, and processing the combined GUI actions to generate the particular control signal configuration to flash program the interface module.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The invention claimed is:

1. A method using a graphical user interface ("GUI") to generate firmware for an interface module that enables a plurality of original equipment manufacturer ("OEM") vehicle buttons to control an aftermarket electronic device based on a series of selections from a user, the method comprising:
   establishing a connection via Internet between a configuration system residing on a remote server and a computer, on which the GUI is displayed;

in the GUI, providing a list of vehicles and a list of aftermarket electronic devices for the user to specify a vehicle and the aftermarket electronic device;
based on the user's selection of the vehicle from the list of vehicles in the GUI, displaying in the GUI possible user options of steering wheels that match the vehicle selection
receiving user selection of an option of one specific steering wheel in the GUI, wherein the possible user options that represent the user's actual steering wheel each contain a plurality of OEM vehicle buttons;
displaying the image of one specific steering wheel in the GUI based on a selection of one of the possible user options of the steering wheel from the user;
receiving an assignment command of a first function for the aftermarket electronic device to a first OEM vehicle button displayed on the image of one specific steering wheel;
associating a first duration condition for the first OEM vehicle button with activating the first function;
receiving a second assignment command of a second function for the aftermarket electronic device to the same first OEM vehicle button displayed on the option of one specific steering wheel control;
associating a second duration condition for the first OEM vehicle button with activating the second function;
displaying a desired user configuration of each OEM vehicle button and each OEM vehicle button's corresponding functions for a confirmation from the user;
generating a particular firmware for the interface module based on the series of selection; and
flashing the particular firmware to the interface module via the computer.

2. The method of claim 1, further comprising storing the series of selections to enable transfer of the particular firmware to a second interface module.

3. The method of claim 1, wherein the aftermarket electronic device is a stereo, an entertainment device, or any combination thereof, installed in a vehicle.

4. A method using a graphical user interface ("GUI") to generate a custom firmware for an interface module that enables a plurality of original equipment manufacturer ("OEM") vehicle buttons to control an aftermarket electronic device based on a series of selections, the method comprising:
receiving a user selection of an aftermarket electronic device from a list of aftermarket electronic devices displayed in the GUI
receiving a user selection of a vehicle make, year and model in the GUI;
in response to the user selection of the vehicle make, year and model, displaying a list of possible user options of steering wheels,
receiving user selection of an option of one specific steering wheel from the list of possible user options in the GUI that represents the user's actual steering wheel when a matching steering wheel is displayed in the list of possible user options;
when a matching steering wheel is not displayed in the list:
taking a measurement of a value of a particular OEM vehicle button of a plurality of OEM vehicle buttons in the user's actual steering wheel;
entering the value using the GUI;
receiving user selection of a function of the aftermarket electronic device to associate with the particular OEM vehicle button;
in response to receiving the user selection of the function of the aftermarket electronic device, displaying a desired user configuration of each OEM vehicle button and each OEM vehicle button's corresponding functions to control the aftermarket electronic device, and confirming the desired user configuration;
generating the custom firmware based on the value and the user selection of the function of the aftermarket electronic device; and
flashing the custom firmware to the interface module via the computer.

5. A non-transitory processor readable medium having processor instructions that are executable to cause a processor to:
establish a connection via Internet between a configuration system residing on a remote server and a computer, on which a graphical user interface ("GUI") is displayed;
display the graphical user interface ("GUI") on the computer;
select a vehicle in response to a user choosing the vehicle from a vehicle drop down menu using the GUI;
display possible user options of steering wheels based at least in part on a selected vehicle to permit the user to select an option of one specific steering wheel that represents the user's actual steering wheel;
display an image of one specific steering wheel based on a selection of the possible user options of the steering wheel from the user; the option of one specific steering wheel containing a plurality of original equipment manufacturer ("OEM") control labels on the option, each of the plurality of OEM control labels is positioned in accordance with a physical location of a corresponding OEM control on the steering wheel control;
select an aftermarket electronic device in response to the user choosing the aftermarket electronic device from a device drop down menu using the GUI;
based on a user's selection of a particular OEM control label that is being displayed on the option of one specific steering wheel control, assign a first desired function to a first particular OEM control in response to the user choosing the first desired function from a function drop down menu using the GUI;
specify a first duration condition for the first particular OEM control and associate the first duration condition with activating the first desired function;
based on a second user's selection of the particular OEM control label that is being displayed on the option of one specific steering wheel control, assign a second desired function to the first particular OEM control in response to the user choosing the second desired function from a function drop down menu using the GUI;
specify a second duration condition for the first particular OEM control and associate the second duration condition with activating the second desired function;
generate a particular firmware for an interface module that enables the OEM control to control the aftermarket electronic device via the interface module; and
flash the firmware to the interface module via the computer.

* * * * *